United States Patent
Sutton et al.

(10) Patent No.: US 11,722,654 B1
(45) Date of Patent: Aug. 8, 2023

(54) ANGLE SENSING USING THE TALBOT EFFECT, AN IMAGING SENSOR, AND PHASE/QUADRATURE DEMODULATION

(71) Applicant: MICROSOFT TECHNOLOGY LICENSING, LLC, Redmond, WA (US)

(72) Inventors: Michael Scott Sutton, Arvada, CO (US); James P. Terrell, Jr., Bellevue, CO (US); Dmitriy Churin, Redmond, WA (US); Ishan Chatterjee, Redmond, WA (US); Rayna Demaster-Smith, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/829,325

(22) Filed: May 31, 2022

(51) Int. Cl.
*H04N 13/327* (2018.01)
*G02B 27/42* (2006.01)
(Continued)

(52) U.S. Cl.
CPC ....... *H04N 13/327* (2018.05); *G02B 27/4233* (2013.01); *H04N 13/344* (2018.05); *H04N 25/00* (2023.01); *H04N 2013/0081* (2013.01)

(58) Field of Classification Search
CPC .... H04N 13/327; H04N 13/344; H04N 25/00; H04N 2013/0081; G02B 27/4233
See application file for complete search history.

(56) References Cited

U.S. PATENT DOCUMENTS 8,576,143 B1  11/2013  Kelly
11,202,043 B1  12/2021  Elazhary et al.
(Continued)

FOREIGN PATENT DOCUMENTS

CN  107314743 A  * 11/2017  ............ G01B 11/00

OTHER PUBLICATIONS

Wang, et al., "Light field image sensors based on the talbot effect", In Publication of Optical Society of America, Nov. 1, 2009, pp. 1-20.
(Continued)

*Primary Examiner* — Michael Lee
(74) *Attorney, Agent, or Firm* — Newport IP, LLC; Brett A. Hertzberg

(57) ABSTRACT

The techniques disclosed herein may be utilized to detect, measure, and/or compensate for misalignments of a display that may occur after manufacturing. A Talbot sensor is described that includes a diffraction device and an image sensor. Captured images from the image sensor include pixel data values that include bright and dark spots that represent a diffraction pattern associated with the Talbot sensor. A demodulator multiplies the pixel data values with sine and cosine reference images to generate averaged in-phase and quadrature values, which can be used to determine a phase angle for incident light on the Talbot sensor. Phase angle changes over time indicate changes in the alignment of the display, which may be corrected by display parameter manipulation. The resulting devices, systems and methods provide for portable solutions, with reduced cost of manufacturing, reduced part costs, and reduced complexity.

20 Claims, 20 Drawing Sheets

(51) Int. Cl.
*H04N 13/344* (2018.01)
*H04N 25/00* (2023.01)
*H04N 13/00* (2018.01)

(56) References Cited

U.S. PATENT DOCUMENTS

| | | | |
|---|---|---|---|
| 2013/0215730 A1* | 8/2013 | Okamoto | G11B 7/1395 |
| | | | 369/103 |
| 2015/0103330 A1* | 4/2015 | Wilks | G01S 17/894 |
| | | | 356/5.01 |
| 2016/0170103 A1* | 6/2016 | Gill | H04N 23/667 |
| | | | 348/335 |
| 2017/0212225 A1* | 7/2017 | Sommer | G01S 7/4816 |
| 2020/0018968 A1 | 1/2020 | Edwin et al. | |
| 2020/0142298 A1 | 5/2020 | Valentine et al. | |
| 2020/0201042 A1 | 6/2020 | Wang et al. | |
| 2022/0377312 A1 | 11/2022 | Samples et al. | |

OTHER PUBLICATIONS

Whyte, Refael, "Phase Wrapping and its Solution for Indirect Time-of-Flight Depth Sensing", Retrieved From: https://medium.com/chronoptics-time-of-flight/phase-wrapping-and-its-solution-in-time-of-flight-depth-sensing-493aa8b21c42, Nov. 24, 2020, 11 Pages.

"International Search Report and Written Opinion Issued in PCT Application No. PCT/US22/051118", dated Mar. 30, 2023, 12 Pages.

"International Search Report and Written Opinion Issued in PCT Application No. PCT/US22/051119", dated Mar. 20, 2023, 15 Pages.

\* cited by examiner

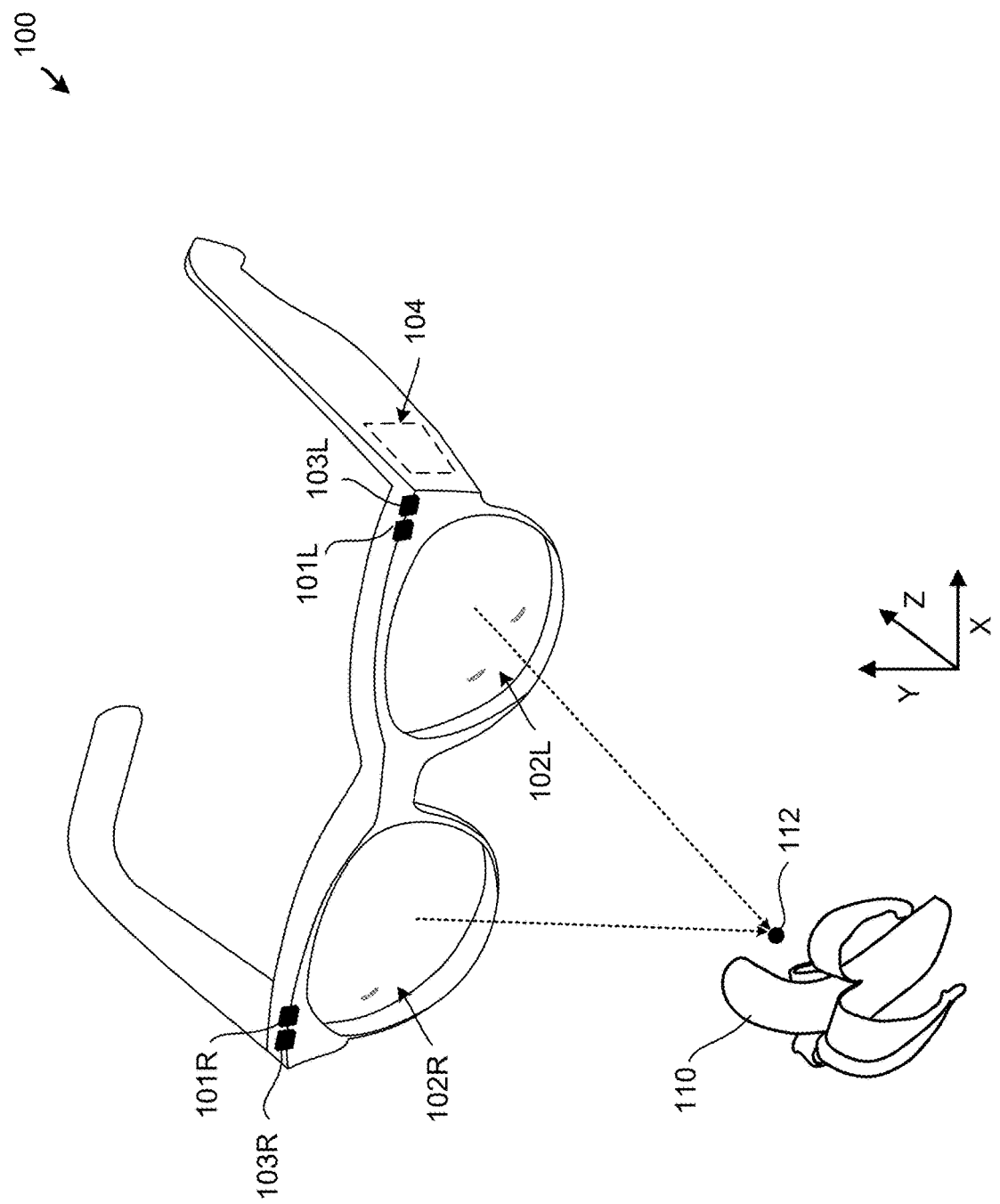

ANGLE SENSING USING THE TALBOT EFFECT, AN IMAGING SENSOR, AND PHASE/QUADRATURE DEMODULATION

BACKGROUND

Mixed Reality (MR), which may include both Augmented Reality (AR) and Virtual Reality (VR), is an industry with a rapidly expanding footprint. An MR device may be implemented with a headset that includes video and audio components to provide the immersive MR experience. An MR device may be implemented in various forms such as a near-eye-display (NED) or head mounted display (HMD) that includes left and right display components as well as left and right audio components.

In stereo augmented reality MR devices, alignment of the two display components is critical for both user comfort and creation of three dimensional (3D) images that can be properly perceived by the user. The positions of the left and right images are controlled so that, the images are processed by the viewer's brain in a way that results in 3D depth perception. For example, the human visual system has difficulty converging right and left images that are vertically disparate from one another. Additionally, horizontally disparate images that are significantly different from natural stereo images can disrupt the primary queue of the human visual system that leads to the creation of the 3D illusion. Thus, if one or both of the images is displayed with any stereo misalignment, the resulting viewing experience can be unpleasant, even causing a feeling of sickness.

Although the two display components may be aligned at the time of manufacture, the alignment between the left and right display components may shift over time due to various factors such as temperature induced mechanical effects, user induced mechanical effects, and aging effects. Disparities on the order of 0.1 mrad are detectable and it is anticipated that these mechanical shifts could be as large as 50 mrad. If these angular shifts can be detected after initial calibration, they can be corrected in the display system. Additionally, in order to fit in small form factor devices, the measurement system needs to be small.

The disclosure made herein is presented with respect to these and other considerations.

SUMMARY

The techniques disclosed herein may be utilized to detect, measure, and/or compensate for misalignments between display components in a display device after the initial calibration done at the time of manufacturing. As will become apparent herein, resulting solutions include devices, sensor and methods that exploit the characteristics of the Talbot Effect to achieve small and portable solutions, with reduced cost of manufacturing, reduced part costs, and reduced complexity, while maintaining a high precision and sensitivity. Techniques described herein may be employed to detect angular changes between display components by detection and/or evaluation of diffraction patterns.

Briefly stated, the techniques disclosed herein may be utilized to detect, measure, and/or compensate for misalignments of a display that may occur after manufacturing. A Talbot sensor is described that includes a diffraction device and an image sensor. Captured images from the image sensor include pixel data values that include bright and dark spots that represent a diffraction pattern associated with the Talbot sensor. A demodulator multiplies the pixel data values with sine and cosine reference images to generate averaged in-phase and quadrature values, which can be used to determine a phase angle for incident light on the Talbot sensor. Phase angle changes over time indicate changes in the alignment of the display, which may be corrected by display parameter manipulation. The resulting devices, systems and methods provide for portable solutions, with reduced cost of manufacturing, reduced part costs, and reduced complexity.

Various embodiments described herein disclose a device that senses a change in alignment of a display by exploiting the Talbot Effect. In some examples, a Talbot sensor is positioned about the display, where the Talbot sensor comprises a diffraction device and an image sensor. The diffraction device includes an array of apertures arranged along a first axis according to a first periodicity, while the image sensor includes an array of image pixels arranged along the first axis according to a second periodicity. The image sensor is configured to capture an image of incident light that passes through one or more of the apertures of the diffraction device and output an array of values for the captured image. A demodulator may be configured to receive the captured image from the Talbot sensor and demodulate the image capture relative to a reference diffraction pattern to generate an in-phase (I) averaged value and a quadrature (Q) averaged values. A phase angle between the in-phase (I) and quadrature (Q) averaged values can be determined, where the phase angle indicates an image alignment difference associated with the display.

In some embodiments a system is described, where the system may be configured to determine an alignment change between two displays. Some examples systems may include a first and a second Talbot sensor. The first Talbot sensor may be positioned about a first of the two displays and configured to generate a first captured image, where the first Talbot sensor includes a first diffraction device and a first image sensor. The second Talbot sensor may be positioned about a second of the two displays and configured to generate a second captured image, where the second Talbot sensor includes a second diffraction device and a second image sensor. A system processor may be configured to receive the captured image from the first and second Talbot sensors. The system processor may include a demodulator and a display subsystem. The demodulator may be configured to demodulate the first captured image relative to a first reference diffraction pattern to detect a first phase angle, and demodulate the second captured image relative to a second reference diffraction pattern to detect a second phase angle. The display subsystem may be configured to receive the first and second phase angles from the demodulator and responsively adjust one or more display parameters associated with one or more of the two displays.

Some embodiments describe methods for determining an alignment change in a display. An example method includes: detecting light that passes through a diffraction device with an image sensor, receiving an array of values of a captured image from the image sensor with a demodulator, demodulating the captured image to generate in-phase and quadrature averaged values with the demodulator, determining a phase angle between the in-phase and quadrature averaged values with the demodulator, and adjusting one or more display parameters associated with display responsive to changes in the determined phase angle.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A is a perspective view of a device configured to detect display misalignments by the use of a Talbot sensor.

DETAILED DESCRIPTION

Figure 1B:
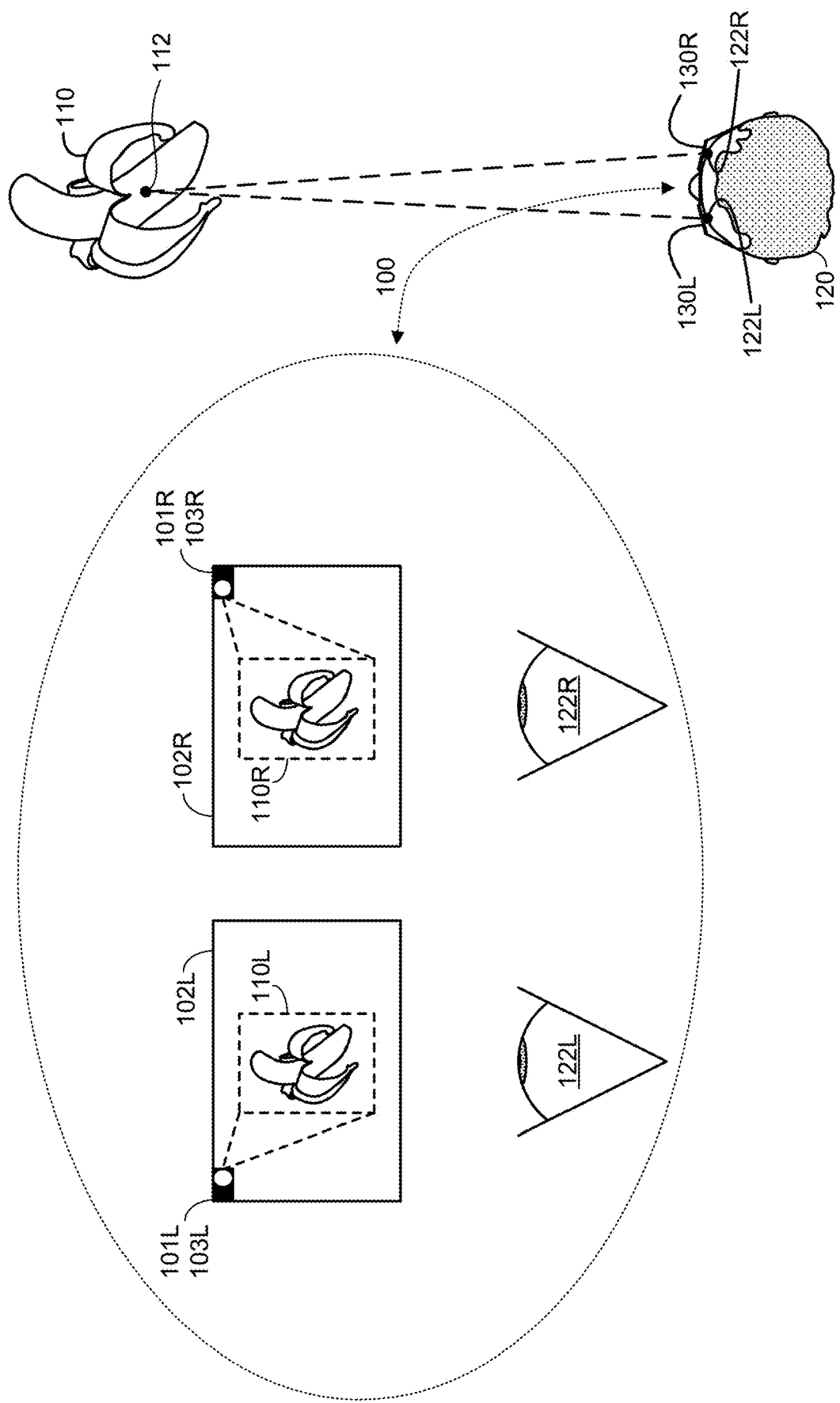
FIG. 1B is a top view that illustrates formation of a 3D image such as for the example device 100 of FIG. 1A.

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a power, current, voltage, or data signal. Based upon context, the term "coupled" may refer to a wave or field coupling effect, which may relate to a corresponding optical field, magnetic field, electrical field, or a combined electromagnetic field.

A Mixed Reality (MR) device, such as a head-mounted display (HMD), presents computer-rendered images to a user's eyes via a set of left and right display components, one for each eye. At the time of manufacturing, the left and right display components are aligned and/or calibrated so that the user can properly perceive 3D images. After manufacturing, the initial alignment may shift over time due to factors such as temperature induced mechanical effects, user induced mechanical effects, and aging effects. Misalignments between these near-eye display components can disrupt the viewing experience in undesirable ways. In addition to having an undesirable image blur or loss of depth perception, some misalignments can induce feelings of discomfort or sickness to the user, such as disorientation, nausea, or headaches.

As used herein, the terms "stereo misalignment" and "misalignment" generally refer to any scenario where the display image presented by a left-eye display component is out of stereo alignment with the display image presented by a right-eye display component. Misalignment may be the result of extrinsic or intrinsic factors. An extrinsic factor may refer to a scenario where one or more portions of a HMD is out of alignment as a result of bending, flexing, forcing, or otherwise physically moving one or more portions of the device (e.g., application of an external force). An intrinsic factor may refer to changes in the either of the left or right image forming display components, such as may occur as a result of changes in ambient temperature, humidity, air pressure, and/or wear-and-tear on the display components due to age and use.

The present disclosure contemplates techniques to detect, measure and/or adjust for misalignments between the display components after the initial calibration done at the time of manufacturing. As will become apparent herein, resulting solutions exploit the characteristics of the Talbot Effect to achieve small and portable solutions, with reduced cost of manufacturing, reduced part costs, and reduced complexity, while maintaining a high precision and sensitivity.

Briefly stated, the techniques disclosed herein may be utilized to detect, measure, and/or compensate for misalignments of a display that may occur after manufacturing. A Talbot sensor is described that includes a diffraction device and an image sensor. Captured images from the image sensor include pixel data values that include bright and dark spots that represent a diffraction pattern associated with the Talbot sensor. A demodulator multiplies the pixel data values with sine and cosine reference images to generate averaged in-phase and quadrature values, which can be used to determine a phase angle for incident light on the Talbot sensor. Phase angle changes over time indicate changes in the alignment of display, which may be corrected by display parameter manipulation. The resulting devices, systems and methods provide for portable solutions, with reduced cost of manufacturing, reduced part costs, and reduced complexity.

Various systems, device, methods, and techniques are described that may beneficially enable detection of stereo misalignment in a manner that is simpler, easier to manufacture, and more cost-effective than conventional approaches that use display angle sensors with complicated arrangements of waveguides, prisms, mirrors, combiners, splitters, camera modules, and other optical components. The herein disclosed techniques also allow for an HMD with a more desirable form factor since there is no need for complicated optics position about the middle of the user's face. Also, example implementations described herein may not require a complex set of left and right inertial measurement units (IMUs), such as gyros, which can sense rotation and infer angular movement between the left and right display components.

FIG. 1A is a perspective view of a device 100 configured to detect display misalignments by the use of a Talbot sensor that is arranged in accordance with embodiments described herein. In some configurations, device 100 can be in the form of a wearable device such as a head mounted display device HMD or near-to-eye display device NED.

Device 100 includes a pair of display imagers 101R, 101L, a pair of lenses 102R, 102L, a pair of Talbot sensors 103R, 103L, each located at a respective right or left side of the device as indicated by the letter R or L. The display imagers 101R, 101L are configured to generate right and left display images by rendering their images on a respective one of lenses 102R, 102L. Thus, the lenses 102R and 102L operate as both waveguides for light from the display imagers 101R, 101L and also as near-eye displays that are viewable by the user's right and left eyes.

In a MR device, computer-generated images may be combined with real-world images to form a virtual or mixed reality context. As shown in FIG. 1A, a computer-generated or virtual image 110 of a banana may be presented to the eyes of the user via the displays rendered on lenses 102R, 102L. The virtual image 110 is virtually located at a focal point 112 within the user's field of view FOV. In this example, the virtual image 110 of the banana is not present in the user's real-world environment. Such a virtual image may be presented as a series of digital image frames presented via the near-eye displays that dynamically update over time—e.g., based on changes in an underlying software application, and/or as a position/orientation of the head-mounted display system changes.

The virtual image 110 presented by the head-mounted display system by display imagers 101R and 101L may be rendered by any suitable image processor type component, including but not limited to a microprocessor, a controller, a digital signal processor (DSP), an application specific integrated circuit (ASIC), a digital circuit, an analog circuit, a video processor, an optical component, or combinations thereof. Such an image processor component may be implemented by an on-board image processor component as part of device 100, an off-board image processor component that is separate from device 100, or as combinations of on board and off board components.

In some examples, device 100 includes fully transparent lenses 102R, 102L, (also referred to as waveguides) which allow the user to directly view real world images through the lenses. In some other examples, device 100 include fully opaque lenses 102R, 102L, which either present real world images as captured by a front-facing camera device, fully virtual images, or combinations thereof, while the opaque lenses block the user's direct view of real world images. In still other examples, device 100 includes semi-transparent lenses 102R, 102L, which allow a user to directly view real-world images along with virtual rendered objects without fully blocking the user's view of the real world.

The user perceives computer generated images such as image 110, as having three dimensions when the two images presented via the right and left display images on the lenses 102R, 102L are aligned appropriately for such interpretation. By controlling the size and position of the left and right display images on lenses 102R and 102L, device 100 renders an apparent three-dimensional position at a virtual focal point 112 relative to the user.

FIG. 1B is a top view that illustrates formation of a 3D image such as for the example device 100 of FIG. 1A. An overhead view of a user 120 is shown with near-eye displays 130R and 130L, formed by display imagers 101R and 101L as images 110R and 110L on lenses 102R and 102L, which are positioned in front of user eyes 122R and 122L. A virtual object 110 having an apparent world-space position at a focal point 112 in front of the user is also shown. Thus, FIG. 1B illustrates how the user's brain interprets a left image 110L and a right image 110R as a single three-dimensional virtual object 110.

Figure 1C:
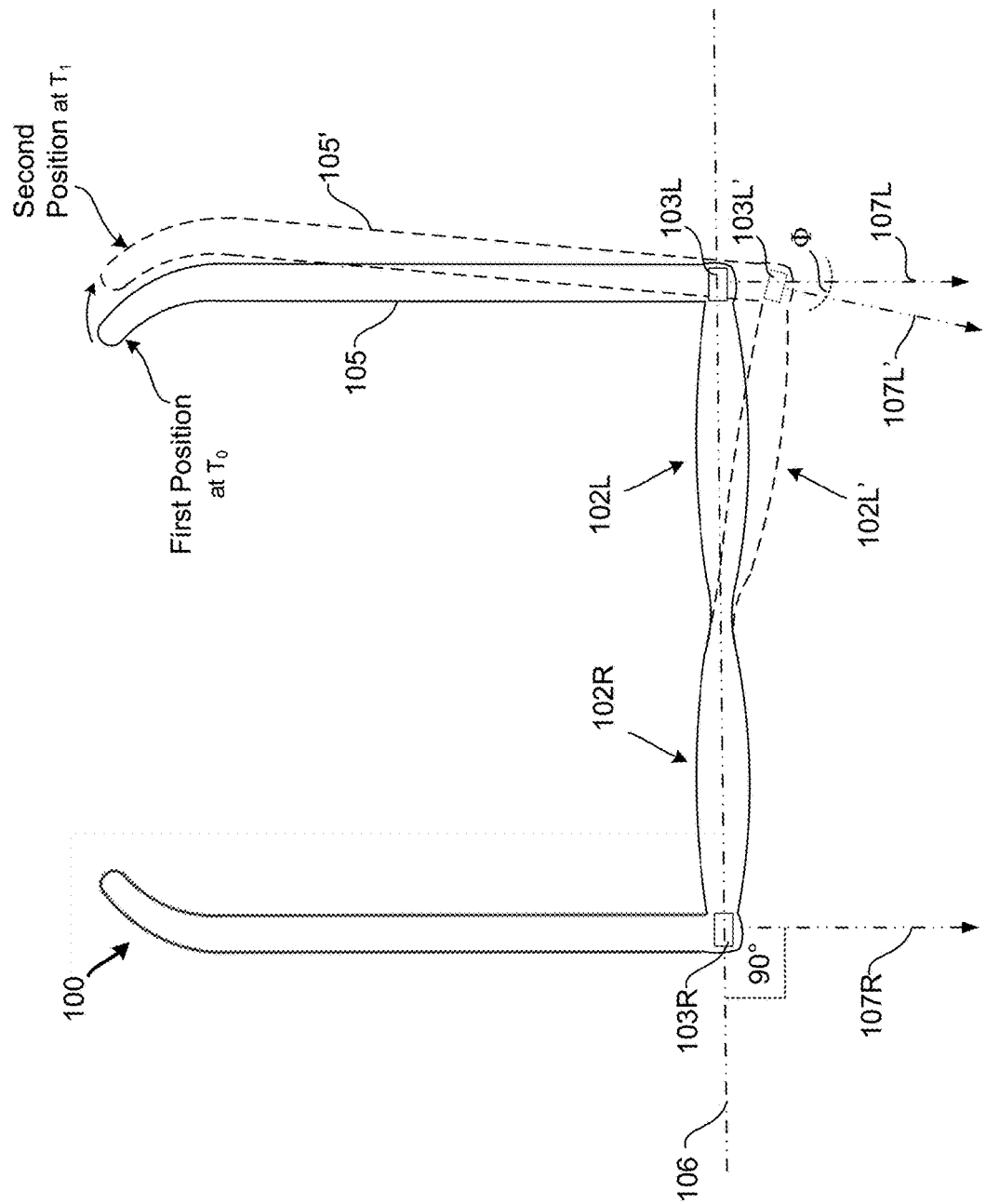
FIG. 1C is a top view of a device that has endured some form of structural change or deformation, between times T1 and T2.

As discussed previously above, misalignments in the head-mounted display system can interfere with the viewing experience, potentially causing discomfort or even feelings of sickness for the user. FIG. 1C is a top view of a device 100 that has endured some form of structural change or deformation, between times $T_1$ and $T_2$. As shown a portion of a frame 105 of the device 100 has been deformed such that the resulting user perceived image may be distorted, blurred or otherwise altered in an undesirable way.

At time $T_1$, the frame 105 of the device is in an aligned orientation such that the lenses 102R and 102L are in a common alignment plane 106. Thus, at time $T_1$ the alignment direction of the Talbot sensors 103R, 103L corresponds to vectors 107R and 107L, which are parallel to one another and orthogonal with respect to the alignment plane 106 of the lenses 102R, 102L. At time $T_2$, the frame 105 of the device 100 is deformed into a new position 105', where the left lens 102L' is no longer in the common alignment plane 106. Also, at time $T_2$ the alignment direction of the Talbot sensors 103R, 103L' corresponds to vectors 107R and 107L', which now differ by an observed angle Φ. The change in the observation angle results in a change in the Talbot Effect, where an angle of change can be calculated by the demodulator 140, as will be described later.

Figure 1D:
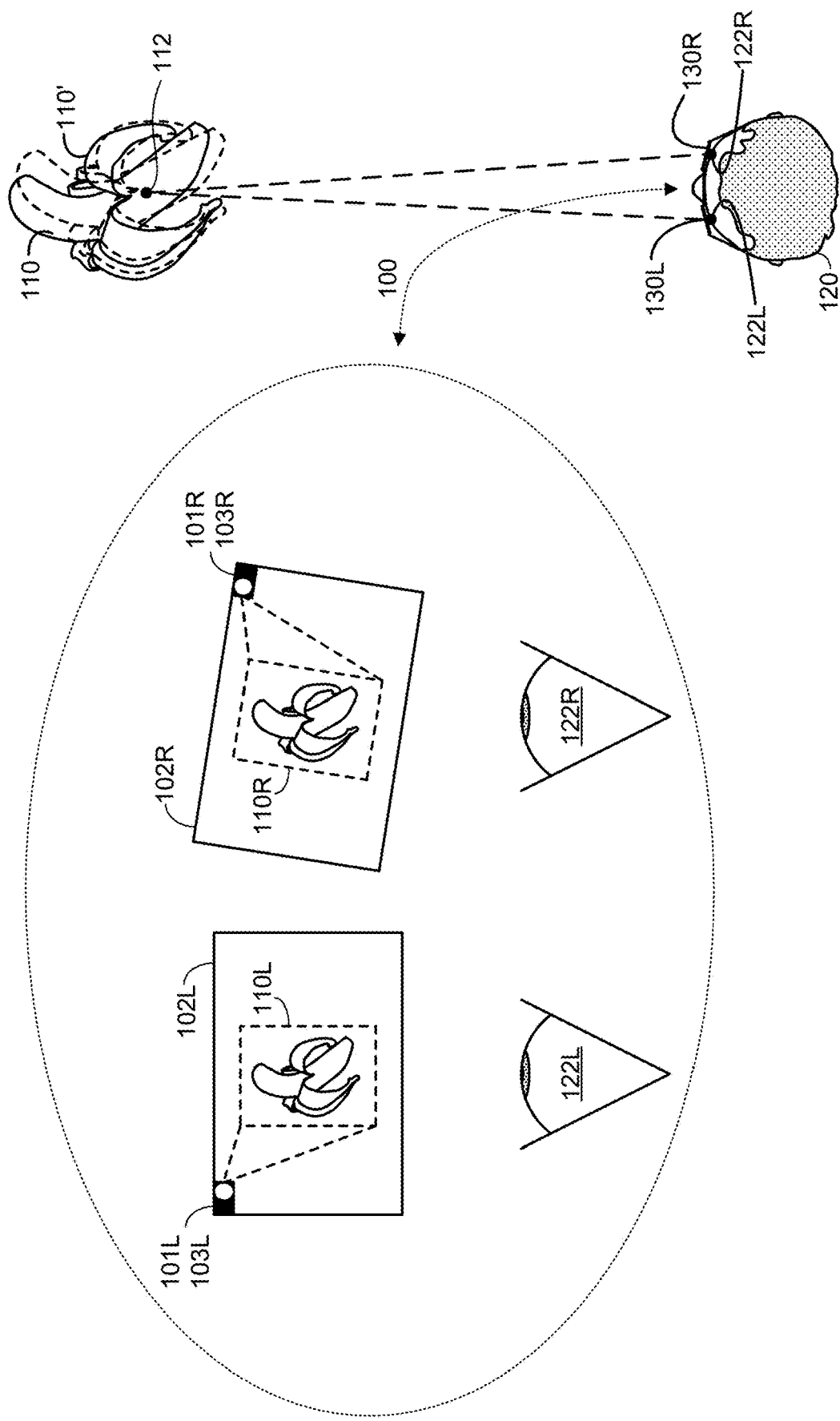
FIG. 1D is a top view that illustrates a device that has a misalignment between the display elements.

FIG. 1D is a top view that illustrates a device 100, such as from FIG. 1B, that has a misalignment between the display elements. An overhead view of a user 120 is shown with near-eye displays 130R and 130L, formed by display imagers 101R and 101L as images 110R and 110L on lenses 102R and 102L, which are positioned in front of user eyes 122R and 122L. A virtual object 110 having an apparent world-space position at a focal point 112 in front of the user is also shown. However, in this example, the right near-eye display 130R is misaligned relative to left near-eye display 130L. More specifically, the right near-eye display image 110R is offset by approximately 10° relative to the left near-eye display image 110L. As such, in this example the two display images do not resolve to a single three-dimensional object 110, but rather are perceived as two different offset images 110 and 110'. This misalignment may simply be distracting at best, or at worst the misalignment may cause discomfort and feelings of sickness for the user.

A demodulator 104 is shown on the left side of device 100 in FIG. 1A, but may alternatively be placed on the right side or replaced by a pair of demodulators on both left and right sides of device 100. Misalignments of the right and left displays on the lenses 102R, 102L may be detected by the operation of the Talbot sensors 103R, 103L and the demodulator 103 as will be described. Additional detailed discussions about the demodulator 104 and the Talbot sensors 103R, 103L will follow with respect to FIGS. 2-8.

Figure 1E:
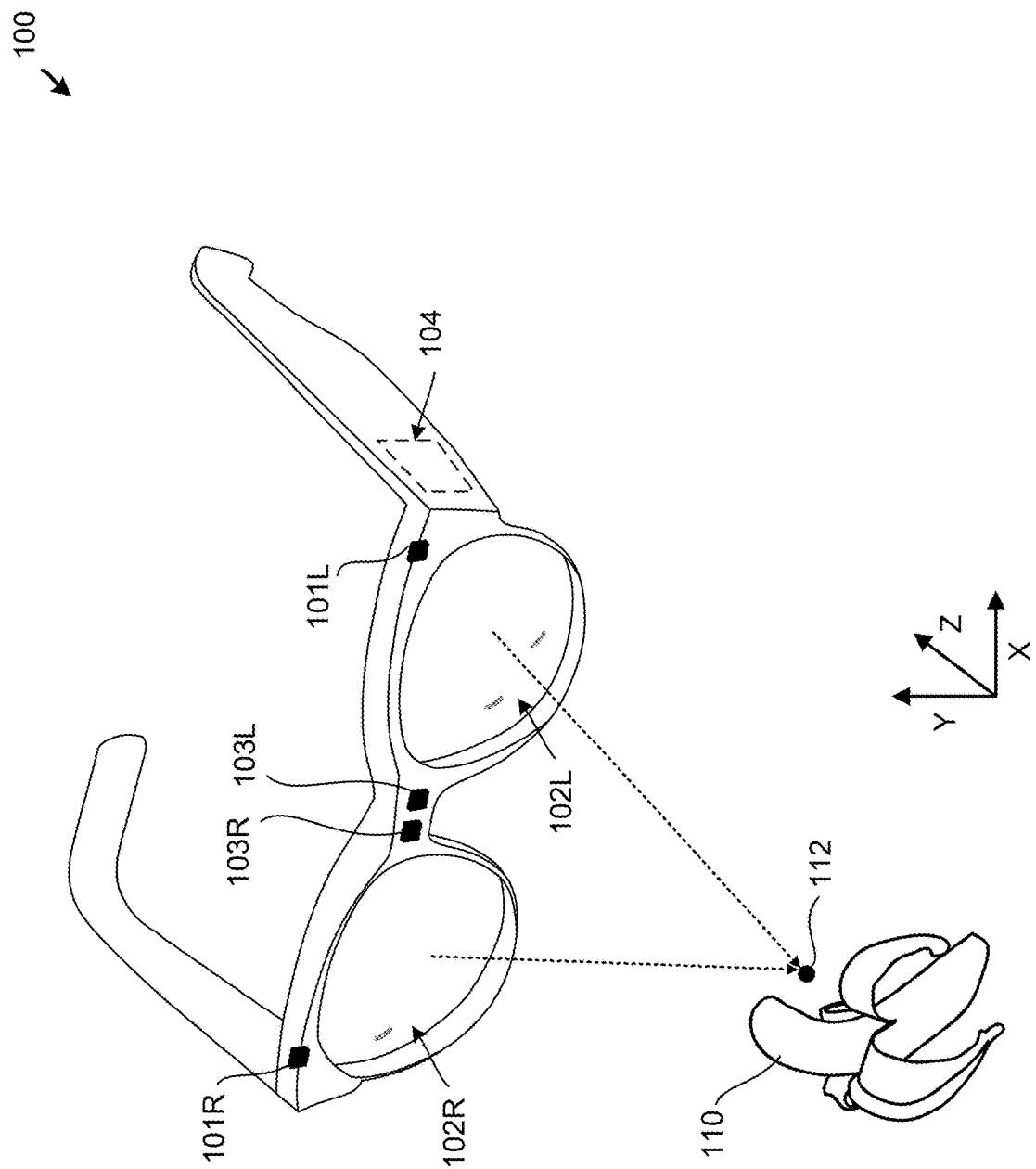
FIG. 1E is a perspective view of another device configured to detect display misalignments by the use of a Talbot sensor.

FIG. 1E is a perspective view of another example device 100 configured to detect display misalignments by the use of a Talbot sensor that is arranged in accordance with embodiments described herein. Device 100 of FIG. 1E is substantially similar to the device 100 of FIG. 1A, except that the location of the Talbot sensors 103R and 103L are located about the central bridge region of the wearable device 100 as shown. The placement of the Talbot sensors about this central bridge region may provide additional benefits since the Talbot sensors have a combined view of the left and right waveguides (lenses) 102R, 102L and thus the combined sensors may be utilized to detect extrinsic changes (e.g., deformation such as in FIG. 1C) without use of any IMUs.

Figure 2A:
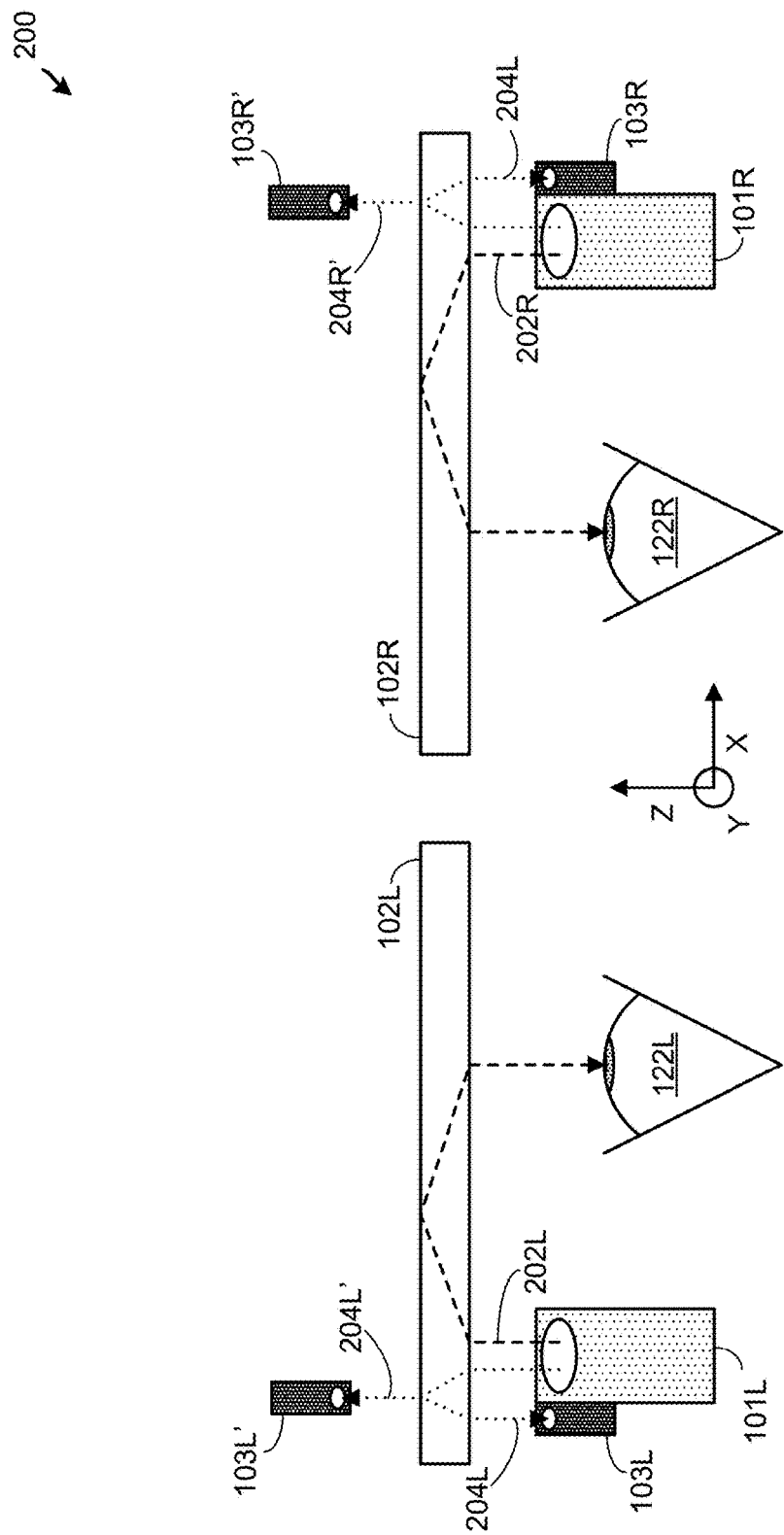
FIG. 2A schematically illustrates an overhead view of a device that is configured to detect misalignments.

FIG. 2A schematically illustrates an overhead view of a device 200 that is configured to detect misalignments in accordance with embodiments described herein. Device 200 includes right and left display imagers 101R, 101L, lenses 102R, 102L, and Talbot sensors 103R, 103L.

The lenses 102R, 102L may also be configured as optical waveguides. The display imagers 101R and 101L are positioned adjacent the waveguide of the lenses 102R and 102L and configure to project light 202R, 202L that is incident on the waveguide. The waveguides of the lenses 102R and 102L are configured to receive the incident light 202R, 202L and form display images that may be received by the users right and left eyes 122R, 122L. Example display images may include virtual objects as previously discussed.

The Talbot sensors 103R and 103L are positioned adjacent the waveguides 102R and 102L on the same side of the waveguide as the display imagers 101R and 101L. The display imagers 101R and 101L may further be configured to emit a test light pattern 204R and 204L that is guided to the corresponding one of the Talbot sensors 103R and 103L by the waveguides 102R and 102L. The Talbot sensors 103R and 103L receive the incident test light pattern 204R and 204L, detect at least some portions of the incident light, and to generate a captured image for further processing to evaluate display alignment characteristics.

In an alternative implementation, the Talbot sensors 103L and 103R may be positioned on the other side of the waveguide as shown by Talbot sensors 103L' and 103R', where the waveguides may guide the test light pattern 204L' and 204R' as shown.

Figure 2B:
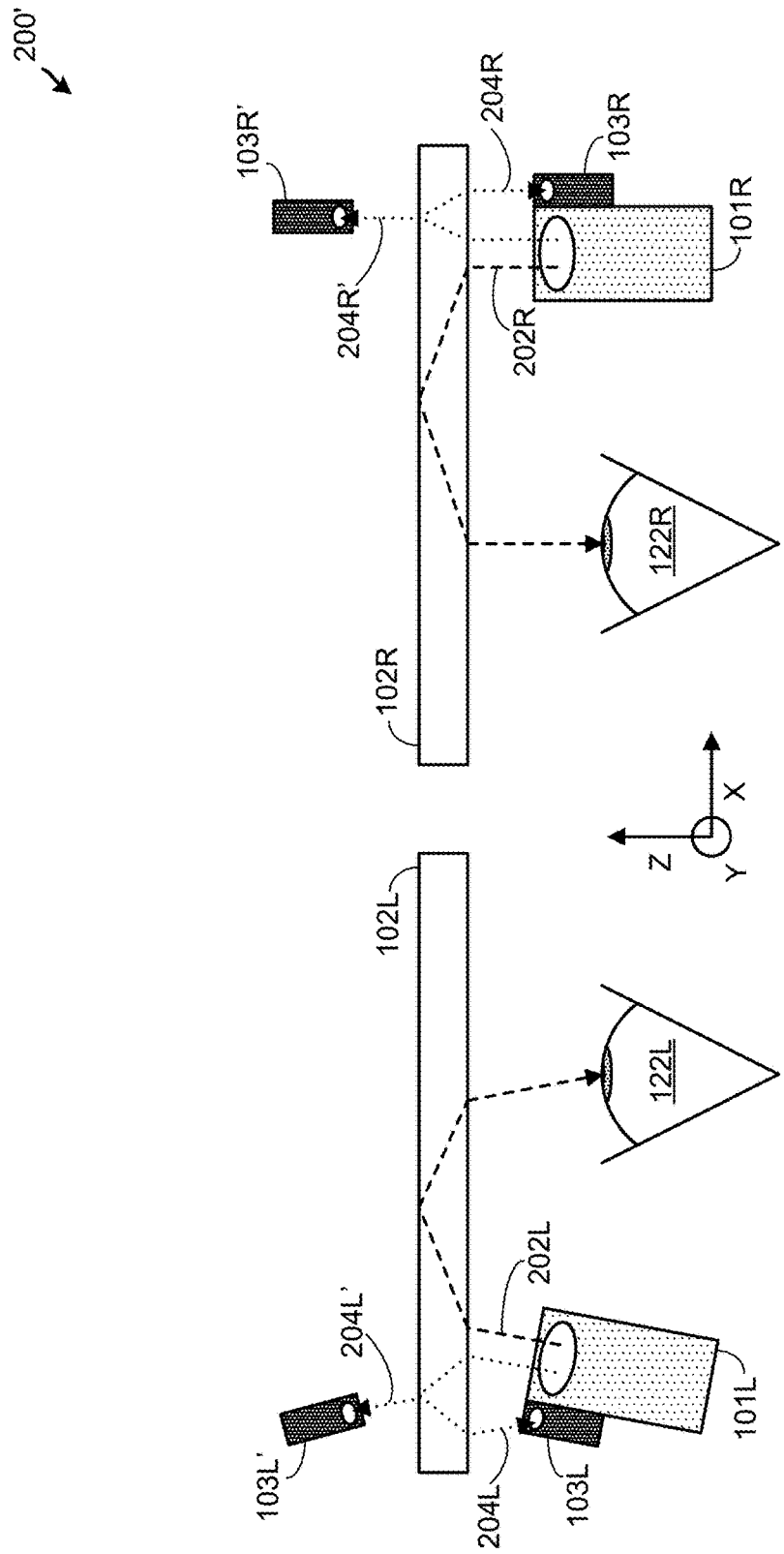
FIG. 2B schematically illustrates an overhead view of a device that is configured to detect misalignments.

FIG. 2B schematically illustrates an overhead view of a device 200' that is configured to detect misalignments in accordance with embodiments described herein. Device 200' is substantially similar to device 200 of FIG. 2A and like components are labelled identically. However, in FIG. 2B, the left side display assembly is misaligned relative to the right side display assembly, as depicted by the angular rotation of the left display imager 101L and the left Talbot sensor 103L (or 103L').

Angular shifts and misalignments such as those depicted may be detected by a Talbot sensor that includes a diffraction device and an image sensor. The diffraction device is positioned to selectively admit or block incident light from reaching the surface of the image sensor via an array of apertures. The apertures can be arranged according to a periodicity, which may be different or varied in different regions of the diffraction device to create different resolutions as may be desired. Before explaining the more complex diffraction device, a simple pinhole camera device is described for illustration purposes.

A simple pinhole camera includes a single aperture (e.g., a pinhole, slit or opening) that is positioned a focal distance away from an image sensor. Such a pinhole camera type of device can be used as an angle sensor. The focal point from the pinhole camera has a spreading function that when illuminated with planar light will create a "spot" on the image sensor, where the angle of the planar light changes and the spot moves over the surface of the image sensor.

Figure 3A:
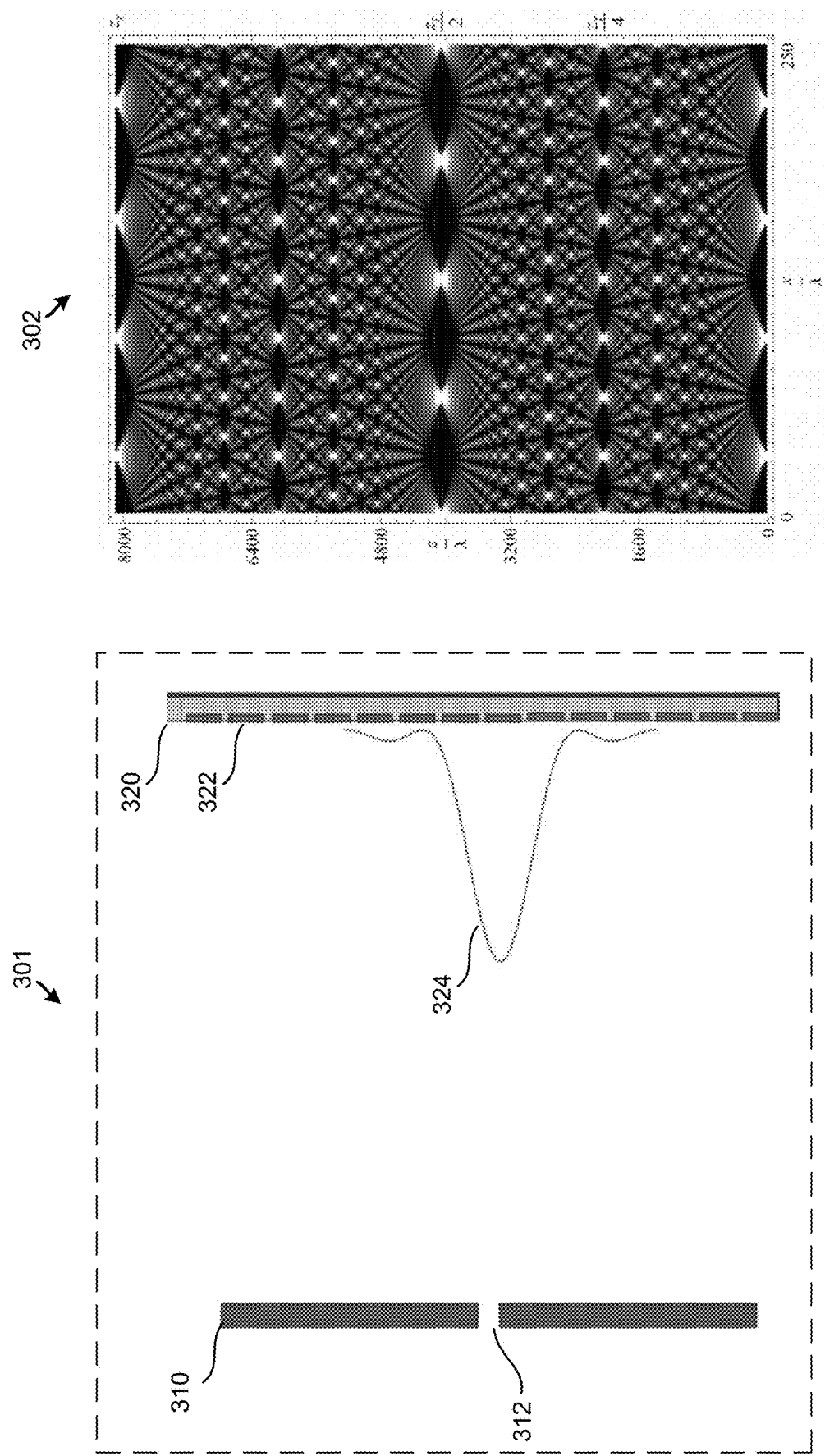
FIG. 3A is a graphical representation of simple angle sensor that includes a grating with a single aperture to admit light on an image sensor.

FIG. 3A is a graphical representation of simple angle sensor 301 that includes a grating 310 with a single aperture 312 to admit light on an image sensor 320. The image sensor 320 includes an array of sensor elements 322 (shown along one axis). The amplitude of the light detected by the image sensor 320 is illustrated graphically as curve 324. As shown, the amplitude is highest on the sensor element 322 that is closest to the aperture, and the amplitude attenuates as the sensors spread away from the aperture. Depending on the angle of the incident light on the aperture, the peak value, which corresponds to the highest optical energy or intensity, will migrate to different positions or sensor elements 322 within the array.

A conventional lens is significantly larger and more costly when compared to a pinhole type of camera device, which at least nominally smaller in overall size and less expensive to realize. Although smaller and less expensive, the overall concept of a pinhole camera as an angle sensor suffers in that a significant portion of incident light is disadvantageously lost or thrown away. However, the concept of a pinhole type of camera can be expanded to include array of apertures, thus maximizing the use of the incident light.

The Talbot Effect is a diffraction effect that is observed when a plane wave is incident upon a periodic grating. At specific distances beyond the grating, repeated images of the periodic grating are observed. The distance is referred to as the Talbot length, and the repeated images are referred to as self-images or Talbot images. The Talbot length ($Z_T$) is given as:

$$Z_T = \frac{2a^2}{\lambda}$$

where "a" corresponds to the period of the diffraction grating and "k" is the wavelength of the light incident on the diffraction grating.

At half the Talbot length, a self-image is also observed, but it is phase-shifted by half a period. Thus, the first phase shifted self-images occur at the distance of:

$$Z_T = \frac{a^2}{\lambda}$$

At smaller regular fractions of the Talbot length (multiples of the grating frequency), sub-images are also observed. Thus, self-images and fractional self-images will occur at distances (z), which is given by:

$$Z = \frac{p}{q}Z_T = \frac{p}{q}\frac{a^2}{\lambda} \quad \text{(Eq. 1)}$$

Where p and q are co-prime integers and p/q is the simplified fraction. The spatial frequency of the imaged grating is increased by a factor of q. Thus, the grating period "a" can be solved as follows:

$$a = \sqrt{\frac{q}{p}z\lambda} = \sqrt{\frac{q}{p}\frac{z}{n}\lambda}$$

And the period of the image is given as:

$$\frac{a}{q} = \sqrt{\frac{1}{pq}\frac{z}{n}\lambda} \quad \text{(Eq. 2)}$$

An example Talbot pattern 302 for a diffraction grating is illustrated in FIG. 3A, often referred to as a Talbot carpet. As shown, at one quarter of the Talbot length, the self-image is halved in size, and appear with half of the period of the grating. At one eighth of the Talbot length, the period and size of the images is halved again, and so forth creating a fractal pattern of sub images with ever-decreasing size.

Figure 3B:
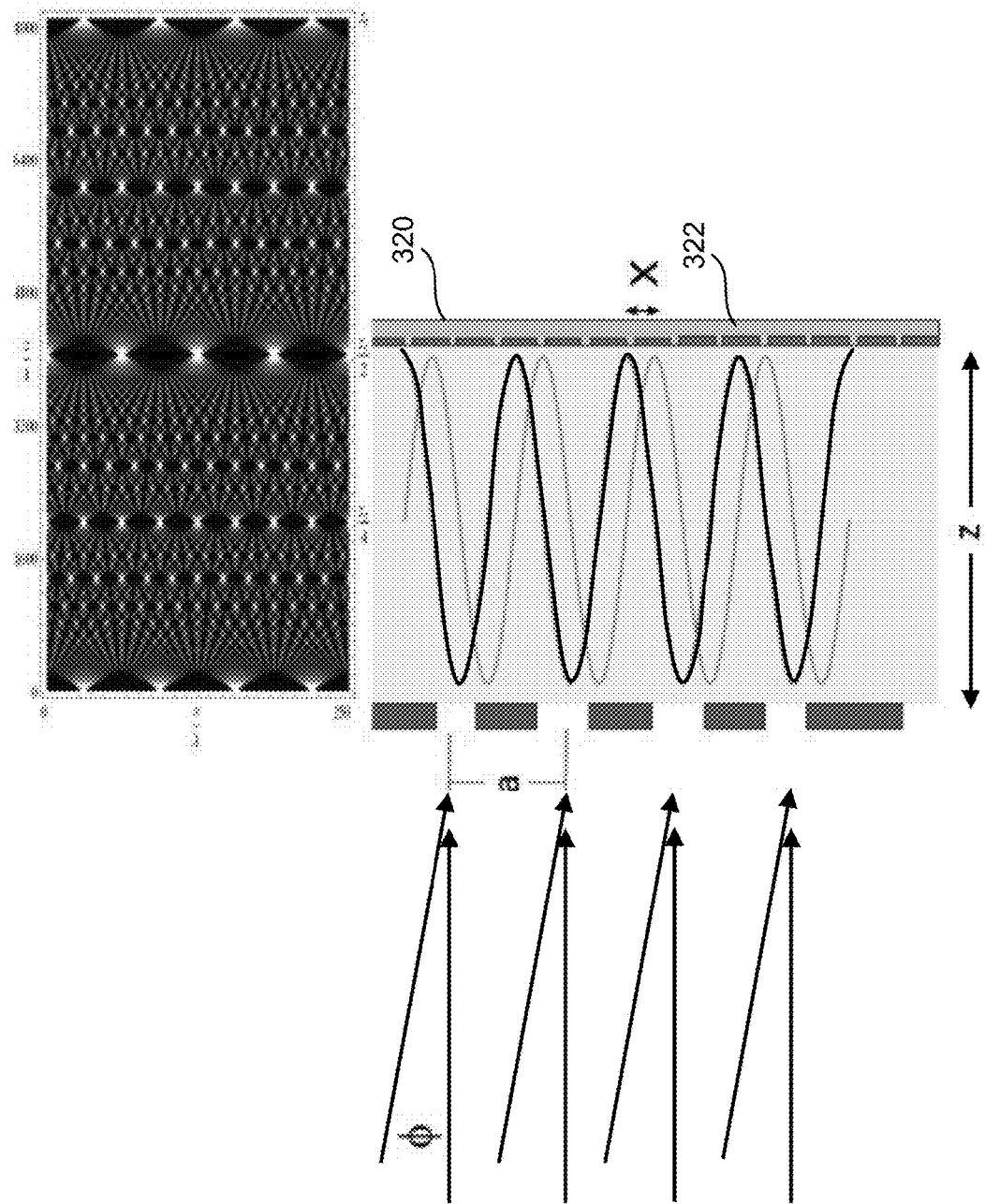
FIG. 3B is a graphical representation of an angle sensor that includes a grating with an array of apertures to admit light on an image sensor.

The Talbot Effect can be used with a single grating to create a self-image on a sensor as shown in FIG. 3B. As shown, the grating period is given as "a", and the diffraction grating is separated from the sensor array by a distance "z". The position of the diffraction pattern on the sensor is directly related to the angle of the incident light. The darker lines correspond to incident light that is normal to the surface of the diffraction grating, while the lighter lines correspond to incident light that arrives at the surface of the grating at an angle Φ. If the position of the diffraction pattern can be precisely determined, then the incident angle can also be determined. The present disclosure contemplates that demodulation is a suitable method to extract the position of the diffraction pattern.

Figure 3C:
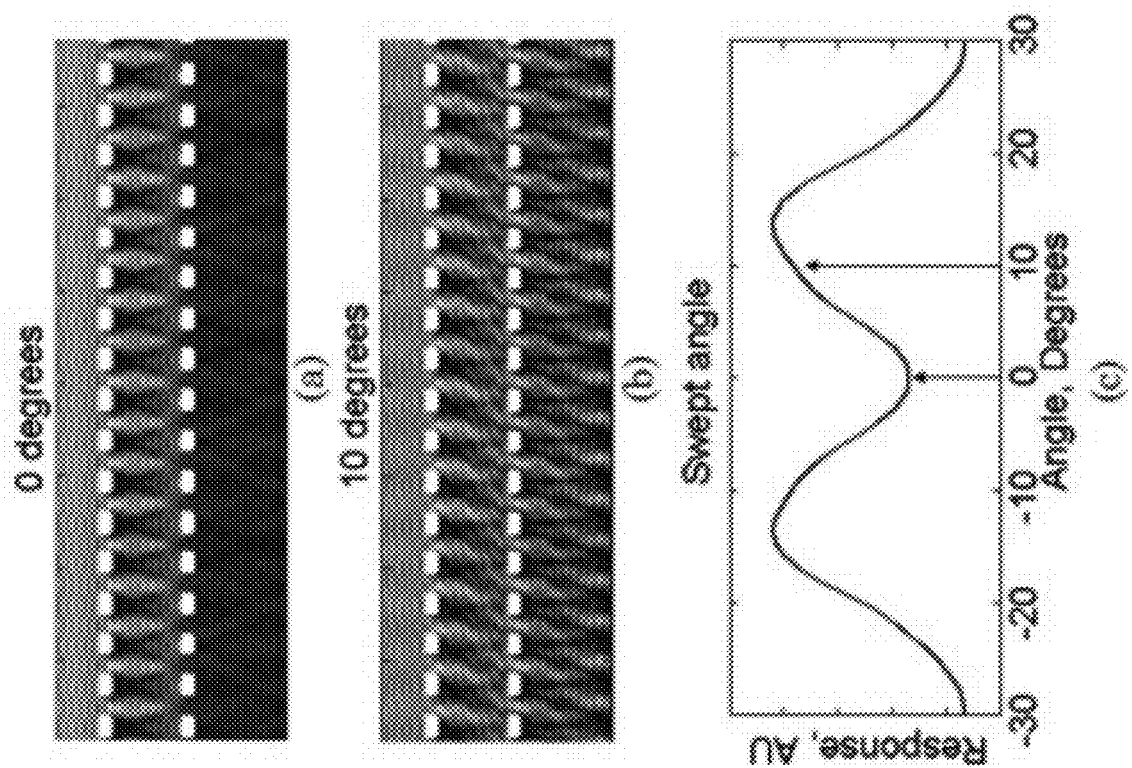
FIG. 3C is a graphical representation to illustrate a response provided by a dual grating structure device.

The Talbot Effect can also be exploited with a two gratings structure to create angle sensitive or light field image sensors, as illustrated by FIG. 3C. A second "detector" grating can be used to block or pass light at specific angles, so the incident light does not reach the sensor unless the light passes both gratings. The top image (a) of FIG. 3C shows the response pattern for an incident angle of 0°, where light passes through the first grating structure while being substantially blocked by the second grating structure. The middle image (b) of FIG. 3C shows the response pattern for an incident angle of 10°, where a portion of light passes through both the top and the bottom grating structures. The lower graph (c) of FIG. 3C shows a combined response of the dual grating structure over a swept incident angle, which has a local minima (a low response amplitude) at an incident angle of 0° and peak responses (highest amplitudes) at angles of about ±15°. A double hump response is also observed, where sweep angles between 0° and ±15° have increased response amplitudes and sweep angles above ±15° and below −15° have attenuated response amplitudes.

Snell's law indicates that the angles of incidence and refraction for an isotropic interface material can be determined by the ratio of the refractive indices (n) of the materials. From a simple Snell's law analysis, the diffraction pattern for a pinhole type of device with a thickness "z" can be shown to change with input angle (ϕ) as:

$$x = \phi\frac{z}{n} \quad \text{(Eq. 3)}$$

The image created by this diffraction pattern is periodic and can only be disambiguated within one period, which is given by Eq. 2. The output of the system may be considered as the ratio of the displacement of the diffraction pattern as determined by Eq. 3 and the period of the diffraction pattern as determined by Eq. 2, where the ratio of the displacement may be given as:

$$\frac{\phi\frac{z}{n}}{\sqrt{\frac{1}{pq}\frac{z}{n}\lambda}} = \phi\sqrt{pq\frac{z}{n}\frac{1}{\lambda}}$$

The ratio of displacement may be considered as a phase angle (θ) of the diffraction pattern. Thus, the input angle (ϕ) can be determined as a function of the phase angle (θ) as follows:

$$\phi = \frac{\theta}{2\pi}\sqrt{\frac{1}{pq}\frac{n}{z}\lambda} \quad \text{(Eq. 4)}$$

Figure 4:
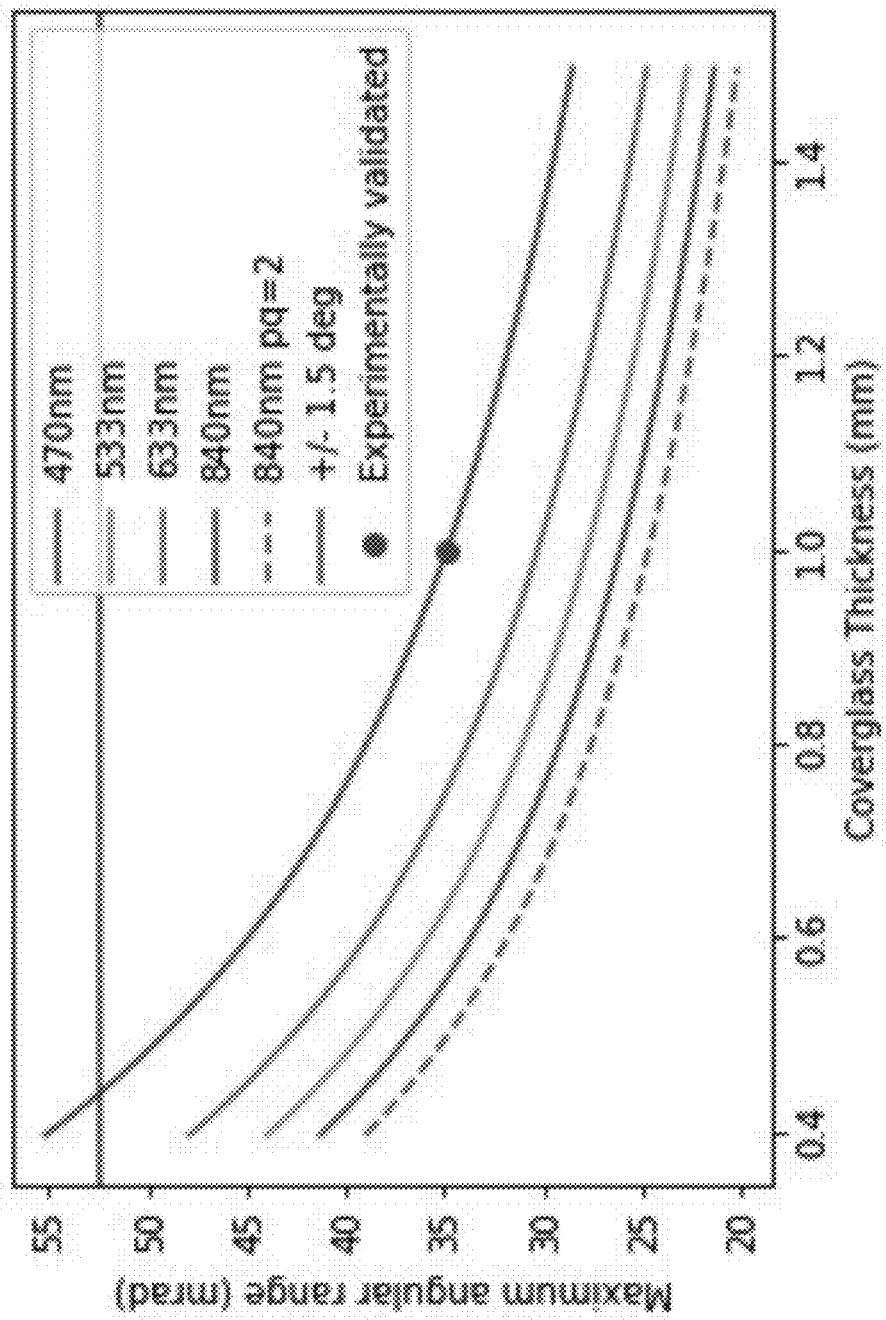
FIG. 4 is a graph that illustrates the maximum angular range for a variety of wavelengths and thicknesses.

In one example, n=1.45, λ=840 nm, and z=1 mm, and the maximum angle before phase wrap is 35 mrad, which is not quite accurate enough for a high sensitivity angle detector. Additionally, the values of p and q may further reduce this maximum phase angle. Given, the same values of n and λ, the sensitivity requirements may improve with a thickness of z=0.44 mm, which would come with a reduction in accuracy as will be discussed further below. FIG. 4 is a graph that illustrates the maximum angular range for a variety of wavelengths and thicknesses.

The phase wrap limitation in angular range can be overcome if multiple gratings with different p and q values are utilized. This approach is discussed further below.

Figure 5:
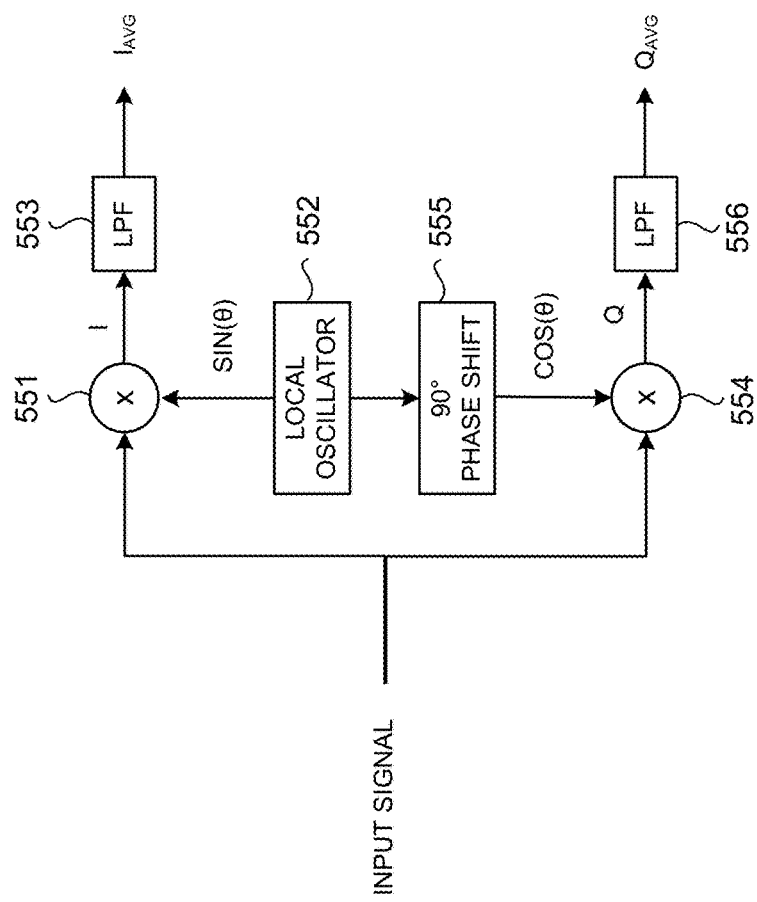
FIG. 5 shows an example phase-quadrature demodulator for an angle detector device.

A phase-quadrature demodulation process can be used to determine the phase of the diffraction pattern with high accuracy. One example phase-quadrature demodulator is illustrated in FIG. 5. As illustrated, the demodulator 500 includes two multipliers 551, 554, a local oscillator 552, a phase shifter 555, and two low pass filters 553, 556. The local oscillator 552 generates a sine wave signal that is multiplied by the input signal to generate an in-phase signal (I) component that can be averaged by the first low pass filter 553 ($I_{AVG}$). The phase shifter 555 receives the sine wave signal from the local oscillator 552, and generates a 90° phase shifted signal, or cosine signal. The cosine signal is multiplied by the input signal to generate a quadrature-phase signal (Q) component that can be averaged by the second low pass filter 556 ($Q_{AVG}$). The phase angle between the averaged I and Q signals may thus be given by the arctangent as phase=A TAN($I_{AVG}/Q_{AVG}$).

This described demodulator 500 can be adapted and applied to a diffraction pattern to determine phase angle. Instead of a local oscillator that generates a sine function at a specific frequency, an image of a diffraction pattern at a specific frequency may be employed as a "sine image" to demodulate the in-phase component, while a phase shifted version of the diffraction pattern at the specific frequency may be employed as the "cosine image" to demodulate the quadrature-phase component. Thus, a captured image from a sensor may be multiplied by the by sine and cosine images at the frequency of the diffraction pattern to generate the in-phase (I) and quadrature (Q) components. The in-phase and quadrature components can be averaged, and the phase angle (θ) can be calculated as the arctangent of the ratio of the averaged values.

Phase angle θ is limited to values in a 360° range (from 0 to $2\pi$ in radians), which sets the maximum angular range of the phase angle detection device. However, different phase scale factors can be achieved from Eq. 4 by careful selection of different p and q values.

Figure 6A:
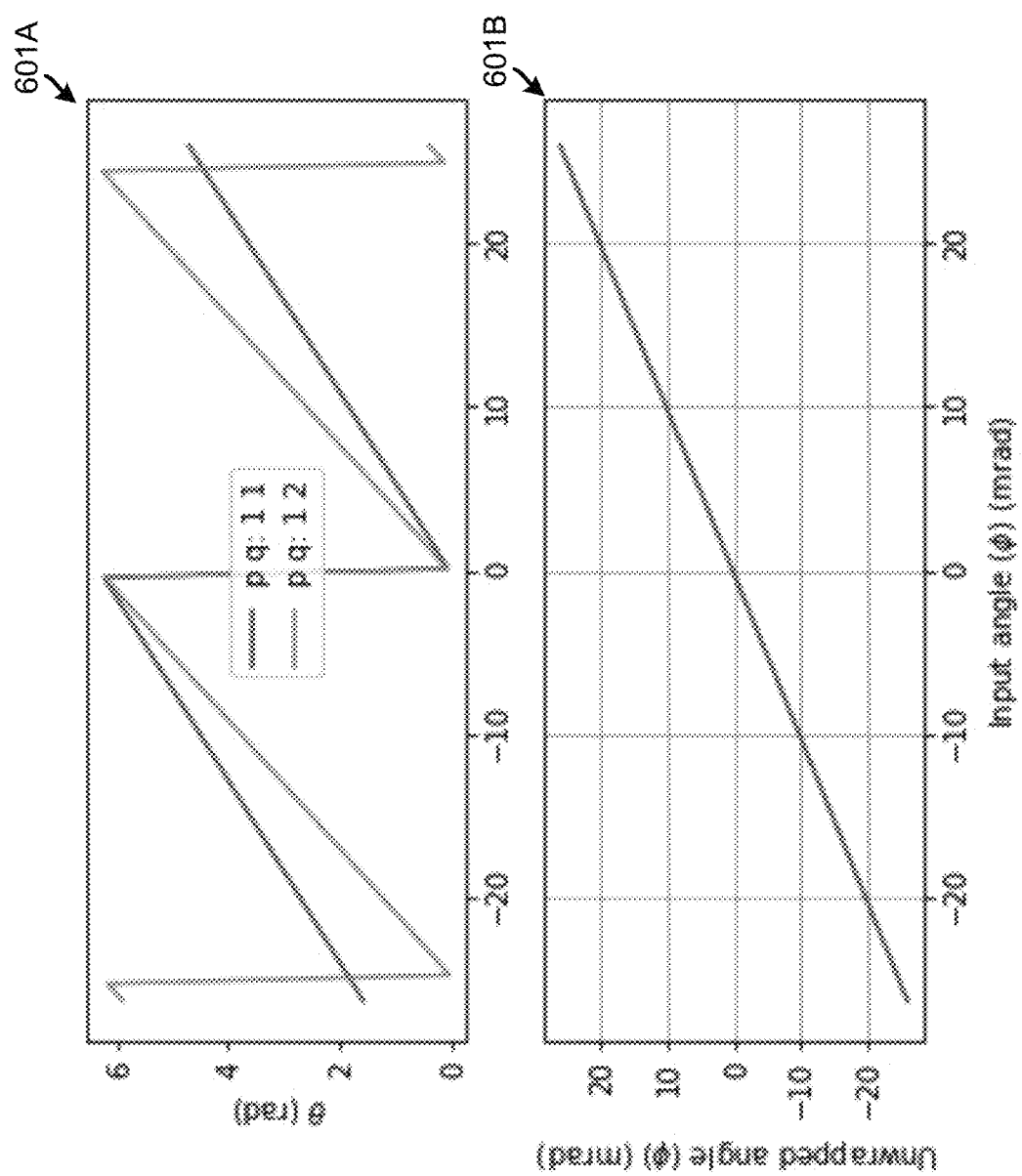
FIG. 6A is a set of graphs that illustrate an example of how phase unwrap may occur in an example angle detector device.

FIG. 6A is a set of graphs that illustrate an example of how phase unwrap may occur in an example angle detector device. Example parameters are given as: n=1.45, λ=840 nm, and z=1 mm, resulting in a maximum phase angle range of about 35 mrads (depending on p and q values) as previously described above with respect to equation Eq. 4. The upper graph in FIG. 6A, graph 601A, demonstrates the phase wrap effect as the angle crosses the zero degree boundary for two sets of values ((p=1, q=1 for the upper line; p=1, q=2 for the lower line in the graph). The lower graph in FIG. 6A, graph 601B, shows an unwrapped phase angle that is continuous over the zero degree boundary.

There are variety of techniques that can be applied to unwrap the phase. In one example, a phase unwrap process may simply be to choose multiples of a that minimize the difference between the two (or more) measurements. For example, two different phase angle measurands may be given as:

$$\phi_1 = \frac{\theta_1 + 2\pi i}{2\pi} \sqrt{\frac{1}{p_1 q_1} \frac{n_1}{z_1} \lambda_1}$$

$$\phi_2 = \frac{\theta_2 + 2\pi j}{2\pi} \sqrt{\frac{1}{p_2 q_2} \frac{n_2}{z_2} \lambda_2}$$

The integer values of "i" and "j" may be selected to minimize the difference between $\phi_1$ and $\phi_2$. The unwrapped version may be represented by the lower graph 601B in FIG. 6A.

In order to meet the Nyquist criteria, the minimum sampling rate should be at least double the maximum frequency. The frequency of sampling "$f_s$" required for sensor pixels is inversely related to the number or size of the sensor pixels $w_p$, where the sampling frequency $f_s$ may be given as $f_s=1/w_p$. The period "T" of the image of the diffraction pattern is determined by Eq. 2 as discussed previously, where T=a/q. Thus, the Nyquist criteria can be expressed as a function of the image period of the diffraction pattern and the number or size of the sensor pixels as follows:

$$\sqrt{\frac{1}{pq} \frac{z}{n} \lambda} > 2w_p.$$

The error in the calculation of the phase angle can be determined based on the period T and sampling frequency $f_s$ as follows:

$$\text{Error} = \frac{1}{2N} \left[ \frac{1}{Tf_s - 2} + \frac{Tf_s}{\pi \sqrt{2}} \right]$$

This Error can be expressed as a fraction of incident phase angle $\phi$ as:

$$\text{Phase Error} = \frac{1}{4N\pi} \left[ \frac{1}{Tf_s - 2} + \frac{Tf_s}{\pi \sqrt{2}} \right] \sqrt{\frac{1}{pq} \frac{n}{z} \lambda} \qquad (\text{Eq. 5})$$

The Error term is an asymptote at the Nyquist frequency, where Error becomes increasingly large as the sampling frequency is reduced down to the Nyquist limit. The Phase Error term represents the number of periods that are sampled $N/(Tf_s)$, where the Phase Error reduces as the number of periods sampled increases.

Figure 6B:
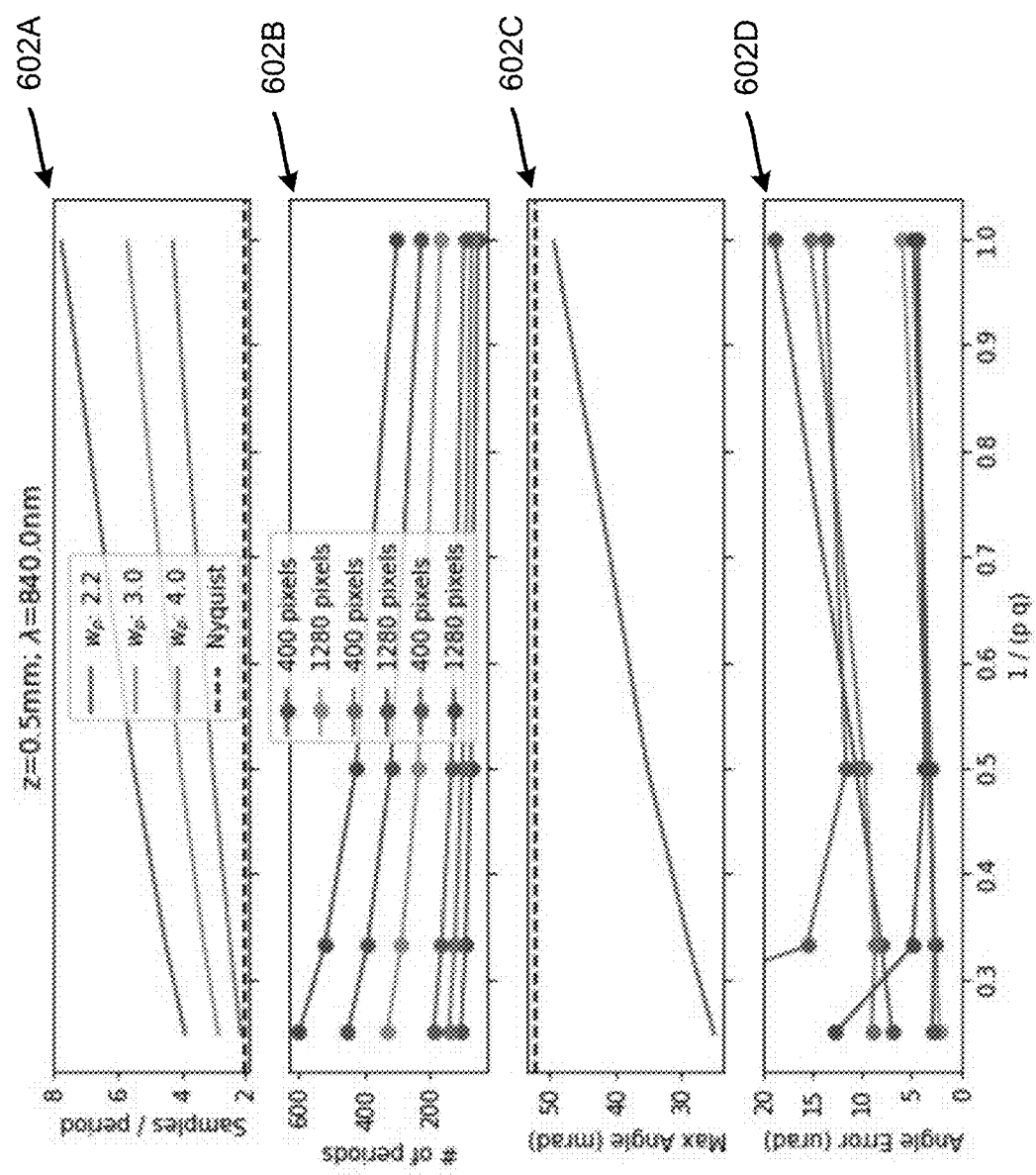
FIG. 6B is a graphical representation of phase angle error for different sampling frequencies, different sensor resolutions, and different p, q values of an angle detector device.

FIG. 6B is a graphical representation of phase angle error from Eq. 5 for different sampling frequencies, different sensor resolutions, and different p, q values. The first graph 602A depicts the number of samples per period for varied values of 1/pq, each line representing different values of $w_p$ or sampling frequency. The second graph 602B depicts the number of periods for varied values of 1/pq, each line representing a different numbers of pixels. The third graph 602C depicts the change in maximum angle for varied values of 1/pq. The fourth graph 602D depicts the angle error for various values of for varied values of 1/pq, each line representing varied values of $w_p$. The graphs show that Angle Error increases substantially as the sampling frequency is decreased and approaches the Nyquist limit. However, in most use cases where a pinhole array angle measuring device is employed, the theoretical resolution appears to be dominated by the second term in Eq. 5, which is related to the number of periods sampled.

Figure 6C:
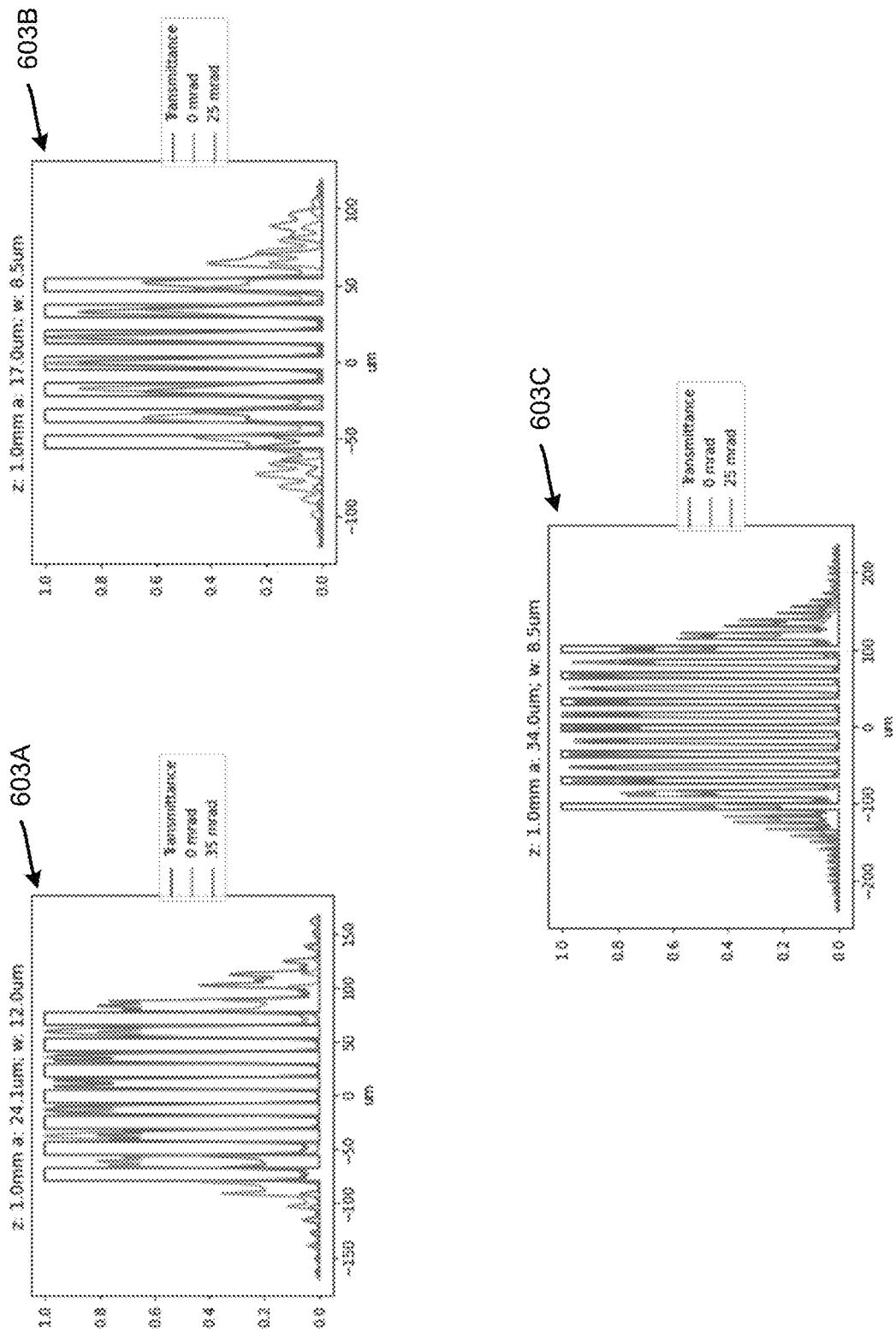
FIG. 6C shows various example 1D diffraction patterns for several p, q values that may be used for an angle detector device.
Figure 7A:
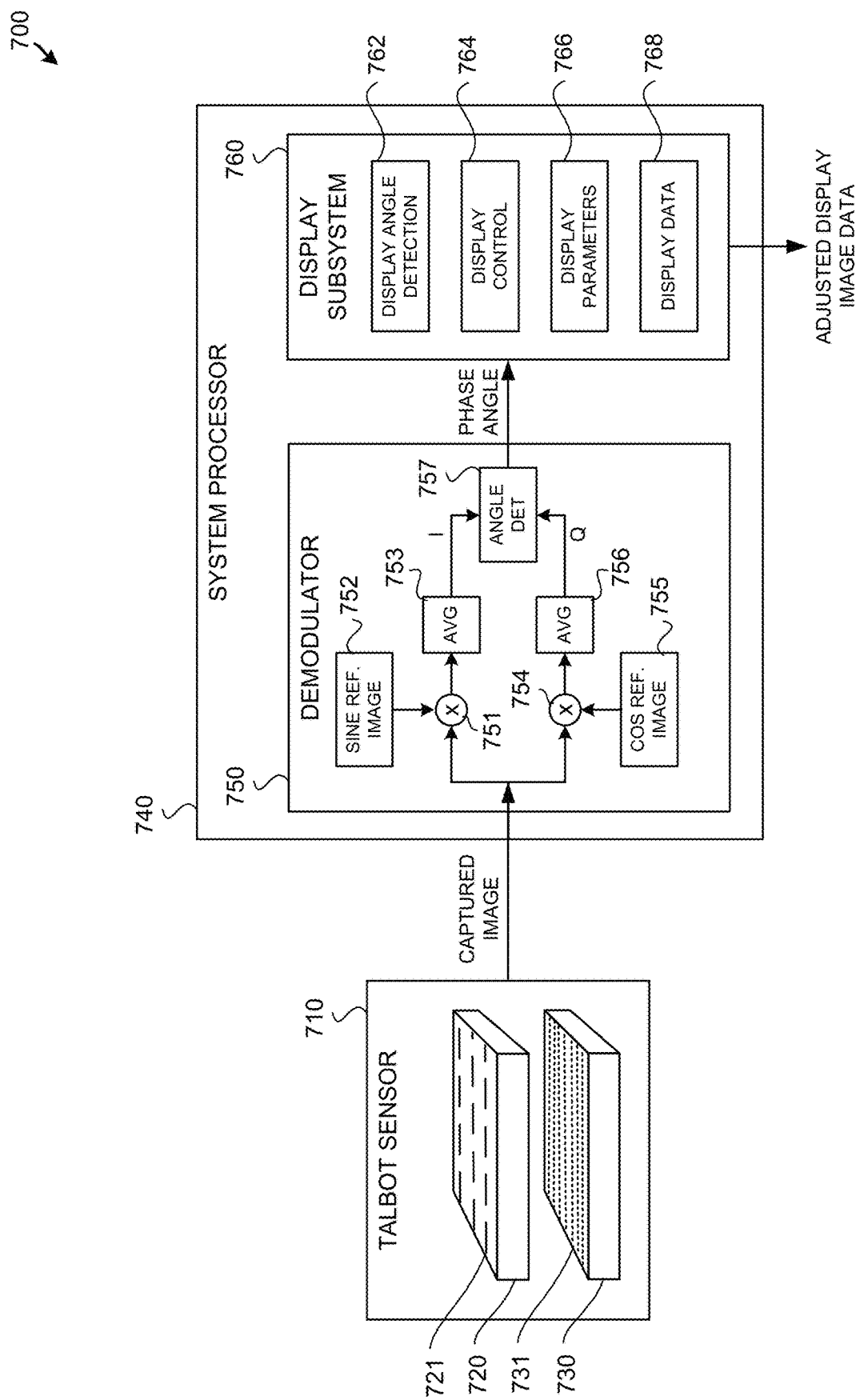
FIG. 7A schematically illustrates an example device with a Talbot sensor and a system processor.
Figure 7B:
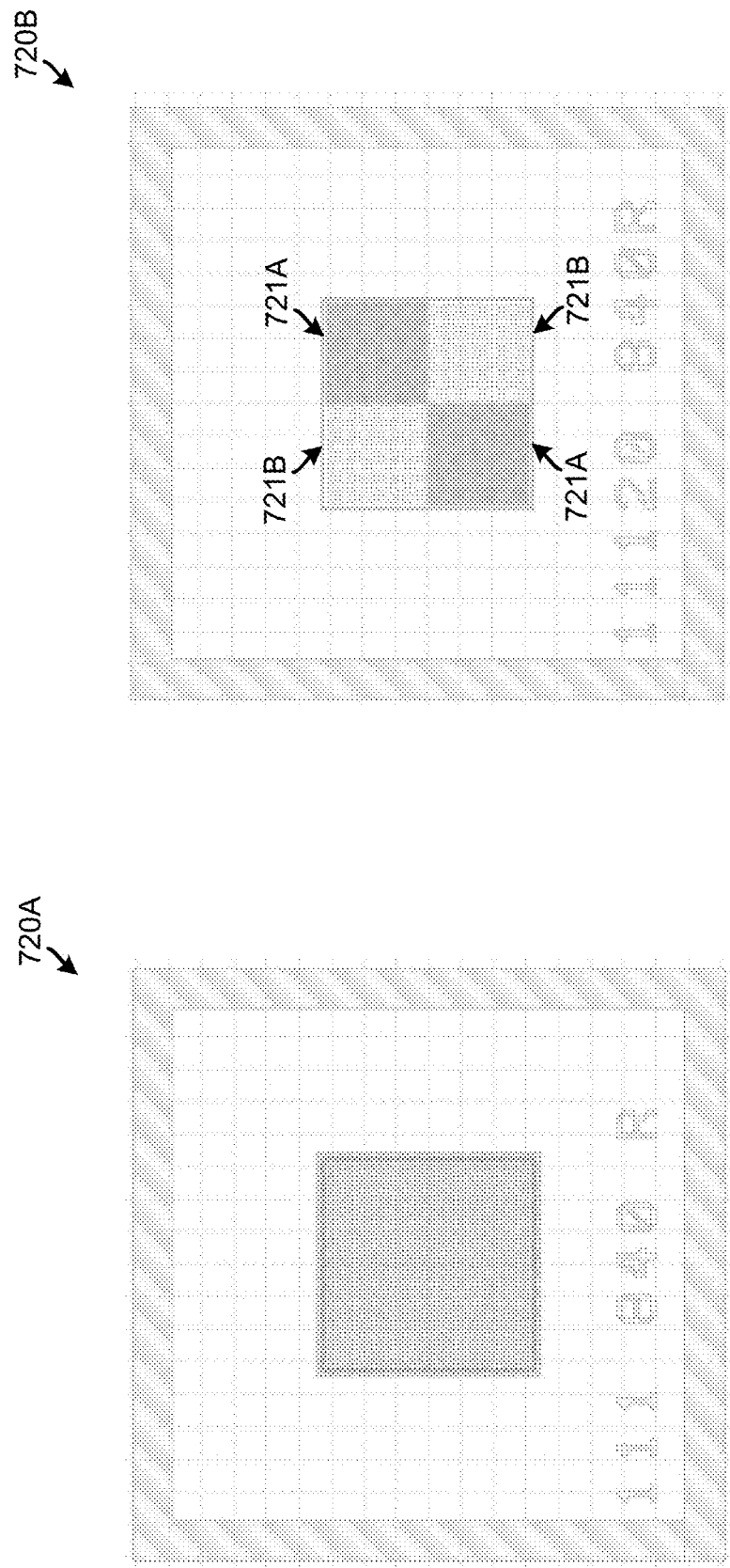
FIG. 7B illustrates a top down view of some example mask designs for a diffractive device of a Talbot sensor.

FIG. 6C shows various example 1D diffraction patterns for several p, q values. In FIG. 6C, normal incident light and phase rollover angle is simulated with a wavelength given as λ=840 nm, and a refractive index given as n=1.45. The first graph 603A depicts a phase reversed self-image ($z=z_T$, p=1, q=1), where z=1.0 mm, a=24.1 um, and w=12.0 um. The second graph 603B depicts a doubled self-image ($z=z_T/2$, p=1, q=2), where z=1.0 mm, a=34.0 um, and w=8.5 um. The third graph 603C depicts a phase reversed self-image ($z=z_T$, p=1, q=1), where z=1.0 mm, a=24.1 um, and w=12.0 um, and where the duty factor of the transmission mask is reduced by a factor of q. It is expected that the 1D diffraction patterns can be extended into additional dimensions to allow angular sensing along multiple direction, as will be discussed further with respect to FIG. 7B, FIG. 7A schematically illustrates an example device or system 700 that is arranged in accordance with various embodiments described herein. As illustrated, device or system 700 includes a Talbot sensor 710, and a system processor 740, where the Talbot sensor 710 is configured to capture images that are processed by the system processor 740. As previously described, one or more Talbot sensor(s) 710 may be configured for a MR device such as adjacent a near-eye display of the MR device. Similarly, the system processor 740 may be configured for the MR device, such as on a frame of the MR device.

The Talbot sensor 710 includes a diffraction device 720 and an image sensor 730. The system processor includes a demodulator 750 and a display subsystem 760. In some examples, the Talbot sensor 710 may also be referred to as a Talbot sensor means, and the system processor 740 may be referred to as a system processor means. Similarly, the diffraction device may be referred to as a diffraction means, the image sensor may be referred to image sensor means, the demodulator may be referred to as demodulator means, and the display subsystem may be referred to as display subsystem means.

Operationally, the Talbot sensor 710 is configured to capture an image responsive to incident light that corresponds to one or more Talbot patterns. The system processor 740 is configured to receive the captured image and determine a display angle difference based on the specifically detected Talbot pattern as previously described.

In a basic implementation an image sensor design may be adapted to operate in as a Talbot sensor 710 that exploits the Talbot Effect as described herein. An example Talbot sensor 710 may include a diffraction device 720 that is positioned over an image sensor 730. The diffraction device 720 (or diffraction means) includes a number of apertures 721 that are aligned along at least one axis according to a periodicity. The image sensor 730 is configured to capture an image of received incident light via an array of pixel sensors 731. The apertures 721 of the diffraction device 720 operationally pass or block incident light from reaching the image sensor 730. The periodicity of the diffraction device 721 will operationally result in a Talbot pattern being captured by the image sensor 730 as the captured image.

The captured image from the talbot sensor 710 is received by the system processor 740. The system processor 740 may process the captured image to demodulate the captured image and determine a phase angle of the captured image via operation of demodulator 750. Demodulator 750 includes functional blocks for a first multiplier 751, a sine reference image 752, a first low pass filter or averager 753, a second multiplier 754, a cosine reference image 755, a second low pass filter or averager 756 and an angle detector 757. The functional blocks of the demodulator may be implemented as physical circuits, functional partitions, logical partitions, or system process partitions, depending on the implementation. Additionally, in some implementations, the demodulator 750 may be implemented as a separate component from the system processor 740 and/or the display subsystem 760.

The demodulator 750 (or demodulator means) determines a phase angle by multiplying the captured image with reference images to generate in-phase and quadrature signal portions, and then determine an angle therefrom. The first multiplier 751 is configured to multiply the captured image with the sine reference image 752 to generate the in-phase signal portion (I). The first low pass filter or averager 753 is configured to average the in-phase signal portion (I) to generate an averaged in-phase signal ($I_{AVG}$). The second multiplier 754 is configured to multiply the captured image with the cosine reference image 755 to generate the quadrature-phase signal portion (Q). The second low pass filter or averager 756 is configured to average the quadrature-phase signal portion (Q) to generate an averaged quadrature-phase signal ($Q_{AVG}$). The angle detector 757 is configured to determine the phase angle from the averaged in-phase and quadrature signals (e.g., Angle=A TAN($I_{AVG}/Q_{AVG}$).

The sine reference image 752 may be stored as a reference image in memory or as a lookup table of values. Similarly, the cosine reference image 752 may be stored as a reference image in memory, as a lookup table of values, or determined as a 90° phase shifted version of the sine reference image 752. During a calibration phase of the device 700, the sine and/or cosine reference images 752, 755 may be determined from the captured image from the Talbot sensor 710.

The system processor 740 may process the phase angle from demodulator 750 with the display subsystem 760. Display subsystem 760 includes functional blocks for display angle detection 762, display control 764, display parameter 766, and display data 768. The functional blocks of the display subsystem may be implemented as physical circuits, functional partitions, logical partitions, or system process partitions, depending on the implementation. Additionally, in some implementations, the display subsystem 760 may be implemented as a separate component from the system processor 740 and/or the demodulator 750.

The display subsystem 760 includes a functional block for display angle detection 762, which processes the phase angle from the demodulator 750. The relationship between the physical display device rotational angles and the phase angle from the demodulator may be a direct mapping, or an indirect mapping that may require additional calculations. For example, in a simplest case, the phase angle is directly mapped to the display angle between left and right near eye displays in a MR device, and thus a simple lookup table may be employed. In additional cases, a more complex calculation such as non-linear, linear, or transformation types of calculations may be required to determine the display angle based on the phase angle.

Once the display angle is determined by the display subsystem 760, one or more display parameters 766 of the left or right display may be adjusted by the display subsystem 760. For example, a rotational angle (in either 2D or 3D space) for one or more of the left or right eye displays may correspond to one of the display parameters 766, where the rotational angle may be applied to image or display data 768 by the display control 764 when an image is formed and projected to the eye of a user. An additional example display parameters 766 may include an image offset to linearly move the position of either a left or right eye display image to an improved position for 3D depth perception by the user. Still another example display parameter 766 may include a contrast or color image adjustment. Yet another example display parameter 766 may include moving a virtual focal point associated with one of the left or right eye display images. Additional display parameters may also be considered within the spirit of this disclosure, where the display parameters enhance the user experience by correcting for display features that may have resulted from misaligned display elements as described herein. The display control 764 applies the adjusted display parameters 766 to the display data 768 to provide adjusted display image data to one or more of the left or right eye display images to correct for features of the misaligned displays.

The image sensor 730 may be implemented in any reasonable type of image sensor means that is configured to capture an image responsive to incident light. Non-limiting examples of image sensors may include complementary metal oxide semiconductor (CMOS) sensors, charge-coupled device (CCD) sensors, and/or photonic or quanta image sensors (QIS). In such examples, the image sensors have defined pixels that are organized in arrays, where each pixel in the array has a corresponding image sensor element that is responsive to incident light to generate pixel data for a captured image or frame. The spacing of the pixels or image sensor elements in the image sensor 730 are typically organized according to a periodic spacing that is uniform along a dimensional axis (e.g., x, y, etc.). The image sensor 730 may optionally include additional layers for filtering or blocking certain types of light or limiting noise. For example, a filter layer may be provided for filtering light of a specific polarization, wavelength, or frequency.

The diffraction device 720 may be implemented as any type of diffraction means that includes an aperture such as a slit, a pinhole, a diaphragm, or another optical mechanism configured to selectively pass or block incident light. The size and precise dimensions of the apertures will be determined by the desired wavelength or range of wavelengths of light that is desired to interact with the diffraction device. Additionally, the spacing between adjacent apertures in the diffraction device may be either the same throughout the entire diffraction device, differing along certain alignment axis of the diffraction device, and/or differing in certain regions of the diffraction device.

In some examples, the diffraction device (or diffraction means) may be implemented as a two-dimensional (2D) array of apertures that are regularly spaced along a dimensional plane such as an x-y plane. For example, a diffraction device may be implemented as a two-dimensional (2D) array of apertures that are uniformly spaced along a first axis (e.g., an x-axis) at a first periodicity, and uniformly spaced along a second axis (e.g., a y-axis) at a second periodicity. When the first and second periodicities are matched, the resulting diffraction device forms a regular array, while mismatched periodicities may provide other benefits such as differing resolution along different coordinate axis.

In some implementations, the diffraction device (or diffraction means) may be arranged according to a non-Cartesian coordinate axis, such as a radial axis with angle and radius such as spokes on a wheel. For example, a first aperture may be located at a central point or hub in the diffraction device, while additional adjacent apertures may be located along different angles or spokes that extend outward from the central point or hub in the diffraction device.

In still other implementations, the diffraction device may be arranged to have two or more different planar regions, where each of the planar regions has a different aperture pattern. For examples, a first region of the diffraction device may have an aperture pattern with a first periodicity between adjacent apertures, while a second region of the diffraction device has an aperture pattern with a second periodicity between adjacent apertures. The sensitivity of the first region may be different from the second region based on the aperture spacing.

The manufacturing of the Talbot sensor 710 may be done using any variety of suitable diffraction device(s) 720 and image sensor(s) 730, which may be separately manufactured as independent devices or manufactured together in an integrated device. In some examples, the diffraction device may be implemented on a glass substrate (or cover-glass for the sensor device), which may use a holographic process and/or an etch process. In a non-limiting example, a metal material (e.g., Gold, Silver, Chrome, etc.) can be coated or deposited on a glass substrate to form a metal layer, a photoreactive layer can be applied over the metal layer, and a mask may be applied to photoreactive layer prior to removal of metal material from the glass to reveal the desired pattern for the diffraction device. Additional examples may include vapor based or vacuum based deposition processes, laser based etching, reactive ion beam etching, or other manufacturing techniques that may be used to form diffraction devices on glass or other transparent substrates.

FIG. 7B illustrates a top down view of some example mask designs 720A and 720B for a diffractive device of a Talbot sensor. Mask design 720A illustrates a mask for a planar array of apertures that are uniformly spaced (e.g., a square array with periodicity the same in X and Y axis directions). In contrast, mask design 720B illustrates a mask for a planar array of apertures that are divided into four regions that are implemented in two different spacings. A first region (upper right quadrant) and a third region (lower left quadrant) of mask 720B have an array of apertures that are spaced according to a first periodicity 721A, while a second region (upper left quadrant) and a fourth region (lower right quadrant) have an array of apertures that are spaced according to a second periodicity 721B. The different periodicities (aperture spacings) result in differing sensitivities or properties that may be exploited together to provide a robust solution to determine phase angle.

Figure 7C:
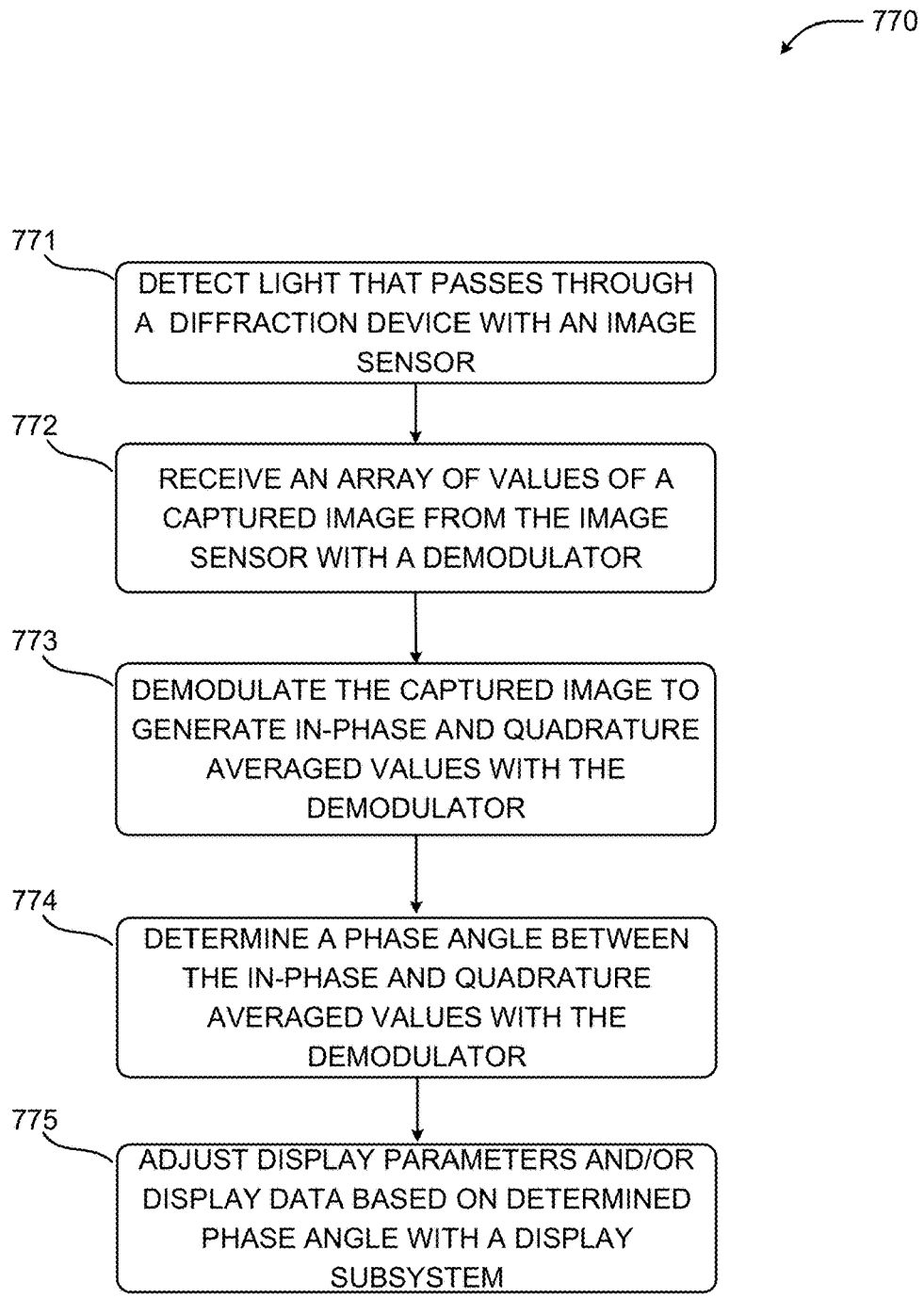
FIG. 7C is a flow diagram of a process to compensate for misalignment of display devices.

FIG. 7C is a flow diagram of a process 770 to detect and/or compensate for misalignment of display devices, arranged in accordance with embodiments described herein. The process 770 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 771, an image sensor detects light that passes through a diffraction device (or diffractive means) with an image sensor (or image sensor means). The image sensor (e.g., a CMOS, CCD, or QIS or any other suitable type of image sensor) and diffraction device (e.g., a diffraction grating, a pinhole array or any other suitable optical diffraction device) may together be referred to as a Talbot sensor (or Talbot sensor means). The Talbot sensor may be mounted and/or positioned about a display of a MR device, where the Talbot sensor is initially in alignment and calibrated with respect to the MR device. Incident light that passes through the diffraction device is detected and the image sensor responsively generates a captured image.

At block 772, an array of values of the capture image from the image sensor are received by a demodulator. The demodulator may be implemented as a standalone electronic device, as a portion of another electronic device, or as a functional portion of a processor that may execute instructions that at least partially implement a demodulation process.

At block 773, the captured image is demodulated by the demodulator to generate in-phase and quadrature averaged values. A detailed description of the demodulation process is found with respect to FIGS. 7A and 7D. The demodulation process takes advantage of the Talbott Effect, where the carrier or oscillator employed in the demodulation corresponds to one or more Talbott images based on a diffraction pattern as discussed further herein.

At block 774, a phase angle is determined between the in-phase and quadrature averaged values with the demodulator. The phase angle corresponds to an angle of incidence associated light that is incident on the Talbott sensor.

At block 775, one or more display parameters and/or display data may be adjusted by a display subsystem based on the determined phase angle from the demodulator. The display subsystem can track changes in the angles of incidence associated with the Talbott sensor for either or both the left or right eye display devices, and thus an angular change can be detected. At the time of manufacturing, the Talbot sensor can be affixed in the MR device about one or more of the displays (e.g., near a lens or display region of a near-eye display), and the angle of incidence for the Talbot sensor is captured as part of the display parameters and calibration information.

As described previously above, due to intrinsic and/or extrinsic factors, image forming display components of the left and right side may become out of alignment with one another. This misalignment may occur as a result of changes in ambient temperature, humidity, air pressure, and/or wear-and-tear on the display components due to age and use. The display parameters may be adjusted by the display subsystem so that the misalignment may compensated. So, for example, display parameters can be adjusted to change an image position (image offset or translation), an image angle (2D or 3D rotational angle), an image virtual focal point (user perceived distance of a virtual object in a scene that may be superimposed over a real world scene), or an image color or contrast (to compensate for color or contrast shift). Since the left and right displays may be out of alignment, the display parameters are different for each of the left and right displays. Additionally, a display control in the display subsystem may apply the adjusted display parameters to display data to provide adjusted display image data to one or more of the left or right eye display images to correct for features of the misaligned displays.

Figure 7D:
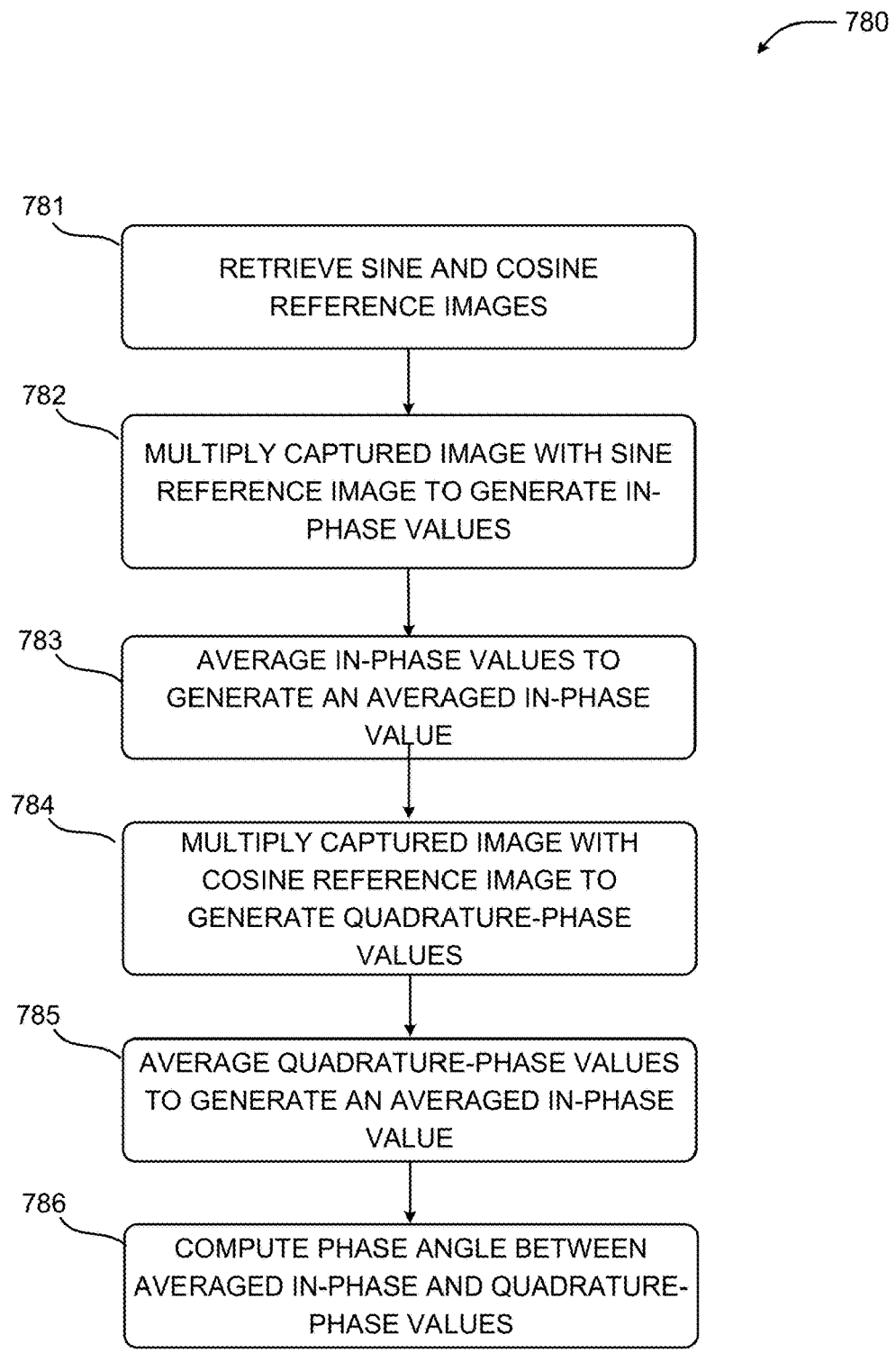
FIG. 7D is a flow diagram of a process to demodulate a captured image to determine a phase angle.

FIG. 7D is a flow diagram of a process 780 to demodulate a captured image to determine a phase angle, in accordance with embodiments described herein. The process 780 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 781, sine and cosine reference images are retrieved by the demodulator. The sine reference image corresponds to a diffraction pattern at a specific frequency may be employed as a "sine image" to demodulate the in-phase component, while a phase shifted version of the diffraction pattern at the specific frequency may be employed as the "cosine image" to demodulate the quadrature-phase component. The reference sine and cosine images employed by the demodulator may correspond to previously stored images, or one of the images may be derived from the other as a phase shifted image, or both reference images may be computer generated. As described previously, the demodulator may be implemented as a standalone electronic device, as a portion of another electronic device, or as a functional portion of a processor that may execute instructions that at least partially implement a demodulation process. Refer to the discussion of FIG. 7A for additional context.

At block 782, the captured image is multiplied by the sine reference image to generate the in-phase values with the demodulator. The captured image corresponds to an array of values from the Talbot sensor, and thus the captured image has a diffraction pattern present in the data values. In other words, bright and dark spots occur in the data values according to a pattern that is determined by the diffraction pattern of the Talbot sensor based on the angle of incident light at the time of the capture. In contrast, the sine reference image values correspond to a diffraction pattern that represents a display that is considered validly in alignment. Thus, the multiplication of the captured image data values and the sine reference image values is comparable to a convolution operation between the original calibrated image data values and the newly captured image data values to generate in-phase values (I).

At block 783, the in-phase values are averaged (or low pass filtered) to generate an averaged in-phase values ($I_{AVG}$).

At block 784, the captured image is multiplied by the cosine reference image to generate the in-phase values with the demodulator. The captured image corresponds to an array of values from the Talbot sensor, and thus the captured image has a diffraction pattern present in the data values. In other words, bright and dark spots occur in the data values according to a pattern that is determined by the diffraction pattern of the Talbot sensor based on the angle of incident light at the time of the capture. Similar to the sine reference image, the cosine reference image values correspond to a diffraction pattern that represents a display that is considered validly in alignment. Thus, the multiplication of the captured image data values and the cosine reference image values is comparable to a convolution operation between the original calibrated image data values and the newly captured image data values to generate quadrature-phase values (Q)

At block 785, the quadrature-phase values are averaged (or low pass filtered) to generate an averaged quadrature-phase values ($Q_{AVG}$).

At block 786, a phase angle is computed based on the averaged in-phase and quadrature-phase values by the demodulator. The phase angle between the averaged I and Q signals may thus be given by the arctangent as phase angle=A TAN($I_{AVG}/Q_{AVG}$).

Figure 8:
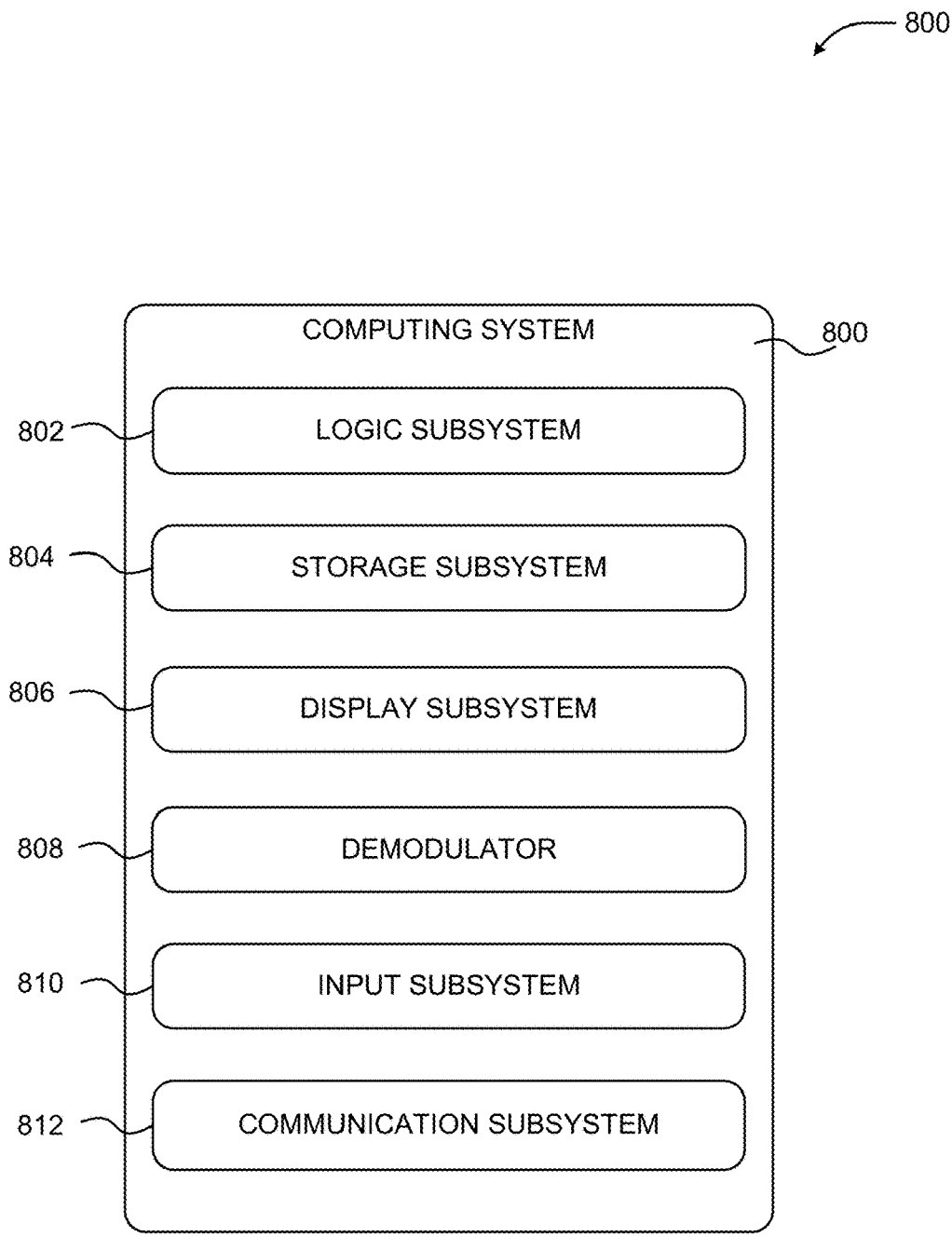
FIG. 8 is a schematic drawing of an example computing system capable of implementing aspects of the techniques and technologies presented herein.

FIG. 8 is a schematic drawing of an example computing system 800 capable of implementing aspects of the techniques and technologies presented herein. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 may include a logic subsystem 802 and a storage subsystem 804. Computing system 800 may optionally include a display subsystem 806, an demodulator 808, an input subsystem 810, communication subsystem 812, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 1104 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, demodulator 808 may be used to process image data for captured images and/or reference images that may be held by storage subsystem 804, and generate phase angle calculations that may be stored in the storage subsystem 804. The phase angle calculations may further be utilized by the display subsystem 806 in a manner sufficient to adjust display images that may be presented to a user through one or more display devices. Demodulator 808 may include one or more functional partitions to perform multiplication of captured images with reference images, averaging or filtering of in-phase and quadrature data resulting from multiplication of images, and determination of angles based on the in-phase and quadrature averaged values.

When included, input subsystem 810 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 812 may be configured to communicatively couple computing system 800 with one or more other computing devices. Communication subsystem 812 may include wired and/or wireless communication devices compatible with one or more different communication protocols. The communication subsystem may be configured for communication via personal-, local- and/or wide-area networks.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The disclosure presented herein also encompasses the subject matter set forth in the following clauses:

Example Clause 1: A device (100) to sense a change in alignment of a display, the device comprising: a Talbot sensor (710) that is positioned about the display, the Talbot sensor comprising: a diffraction device (720) with an array of apertures arranged along a first axis according to a first periodicity; and an image sensor (730) with an array of image pixels arranged along the first axis according to a second periodicity, wherein the image sensor is configured to capture an image of incident light that passes through one or more of the apertures of the diffraction device and output an array of values for the captured image; and a demodulator (750) that is configured to receive the captured image from the Talbot sensor (710) and demodulate the image capture relative to a reference diffraction pattern to generate an in-phase (I) averaged value and a quadrature (Q) averaged values, and compute a phase angle between the in-phase (I) and quadrature (Q) averaged values, wherein the phase angle indicates an image alignment difference associated with the display.

Example Clause 2: The device of any of the example clauses, wherein the diffraction device and the image sensor are further configured to have matched periodicities such that the first periodicity is matched to the second periodicity.

Example Clause 3: The device of any of the example clauses, wherein the diffraction device and the image sensor are further configured to have different periodicities such that the first periodicity is different from the second periodicity.

Example Clause 4: The device of any of the example clauses, wherein the array of apertures of the diffraction device correspond to one of an array of pinholes, an array of slits, or an array of diaphragms.

Example Clause 5: The device of any of the example clauses, wherein the array of apertures of the diffraction device is arranged along the first axis and a second axis as a first two-dimensional array, wherein the first axis and the second axis are orthogonal relative to one another.

Example Clause 6: The device of any of the example clauses, wherein the array of apertures of the diffraction device is arranged along a radial axis about a central point of the diffraction device.

Example Clause 7: The device of any of the example clauses, wherein the diffraction device further comprises two or more different planar regions, where each of the two or more planar regions has a different aperture pattern.

Example Clause 8: The device any of the example clauses, further comprising: a first region of the diffraction device having an aperture pattern with a first periodicity between adjacent apertures, and a second region of the diffraction device having an aperture pattern with a second periodicity between adjacent apertures, wherein the sensitivity of the first region is different from the sensitivity of the second region based on the different aperture spacings.

Example Clause 9: The device of any of the example clauses, wherein the array of image pixels of the image sensor is arranged along the first axis and the second axis as a second two-dimensional array.

Example Clause 10: The device of any of the example clauses, wherein the image sensor corresponds to one or more of a CMOS image sensor, a CCD image sensor or a QIS image sensor.

Example Clause 11: The device of any of the example clauses, wherein the demodulator comprises: a first multiplier, a second multiplier, a first averager, a second averager, and an angle detector, wherein the first multiplier is configured to multiply the image capture with an in-phase reference image to generate in-phase values; the first averager is configured to average the in-phase values to generate the in-phase averaged value; the second multiplier is configured to multiply the image capture with a quadrature reference image to generate quadrature values; the second averager is configured to average the quadrature values to generate the quadrature averaged value; and the angle detector is configured to compute the phase angle from the in-phase averaged value and the quadrature averaged value.

Example Clause 12: The device of any of the example clauses, wherein the reference diffraction pattern corresponds to the array of values for the captured image after the device is calibrated.

Example Clause 13: The device of any of the example clauses, wherein the reference diffraction pattern comprises one or more a sine reference image, a cosine reference image, corresponds to the array of values for the captured image after the device is calibrated.

Example Clause 14: The device of any of the example clauses, wherein the demodulator comprises one of: a stand-alone electronic device, a portion of another electronic device, or a functional portion of a processor that may be configured to execute instructions to at least partially implement a demodulation process.

Example Clause 15: A system (700) to determine an alignment change between two displays (102L, 102R), the system comprising: a first Talbot sensor (103L) that is positioned about one of the two displays (102L) and configured to generate a first captured image, wherein the first Talbot sensor includes a first diffraction device and a first image sensor; a second Talbot sensor (103R) that is positioned about a second of the two displays (102R) and configured to generate a second captured image, wherein the second Talbot sensor includes a second diffraction device and a second image sensor; a system processor (140, 740) that is configured to receive the captured images from the first and second Talbot sensors (103L, 103R), the system processor (740) comprising: a demodulator (750) that is configured to: demodulate the first captured image relative to a first reference diffraction pattern to detect a first phase angle; and demodulate the second captured image relative to a second reference diffraction pattern to detect a second phase angle; and a display subsystem (760) that is configured to receive the first and second phase angles from the demodulator (750) and responsively adjust one or more display parameters (766) associated with one or more of the two displays.

Example Clause 16: The system of any of the example clauses, wherein: the first diffraction device includes an array of apertures arranged according to a first periodicity; the second diffraction device includes an array of apertures arranged according to the first periodicity; the first image sensor includes a first array of image pixels configured to capture the first captured image as incident light passes through one or more of the apertures of the first diffraction device; and the second image sensor includes a second array of image pixels configured to capture the second captured image as incident light passes through one or more of the apertures of the second diffraction device.

Example Clause 17: The system of any of the example clauses, wherein the display subsystem is further configured to adjust display parameters for one or more of: an image position, an image angle, an image virtual focal point, an image color, an image contrast to correct for features of misaligned displays.

Example Clause 18: A method (770) for determining an alignment change in a display (102L, 102R), the method comprising: detecting light that passes through a diffraction device with an image sensor; receiving an array of values of a captured image from the image sensor with a demodulator; demodulating the captured image to generate in-phase and quadrature averaged values with the demodulator; determining a phase angle between the in-phase and quadrature averaged values with the demodulator; and adjusting one or more display parameters associated with the display responsive to changes in the determined phase angle.

Example Clause 19: The method of any of the example clauses, wherein demodulating the captured image further comprises: multiplying the captured image with a sine reference image to generate in-phase values; multiplying the captured image with a cosine reference image to generate quadrature values; averaging the in-phase values to generate averaged in-phase values; averaging the quadrature values to generate averaged quadrature values; and determining the phase angle from the ratio of the averaged in-phase and averaged quadrature values.

Example Clause 20: The method of any of the example clauses, further comprising capturing the sine and cosine reference images from the image sensor after an initial calibration.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A device to sense a change in alignment of a display, the device comprising:
   a Talbot sensor that is positioned about the display, the Talbot sensor comprising:
      a diffraction device with an array of apertures arranged along a first axis according to a first periodicity; and
      an image sensor with an array of image pixels arranged along the first axis according to a second periodicity, wherein the image sensor is configured to capture an image of incident light that passes through one or more of the apertures of the diffraction device and output an array of values for the captured image; and
   a demodulator that is configured to receive the captured image from the Talbot sensor and demodulate the image capture relative to a reference diffraction pattern to generate an in-phase (I) averaged value and a quadrature (Q) averaged values, and compute a phase angle between the in-phase (I) and quadrature (Q) averaged values, wherein the phase angle indicates an image alignment difference associated with the display.

2. The device of claim 1, wherein the diffraction device and the image sensor are further configured to have matched periodicities such that the first periodicity is matched to the second periodicity.

3. The device of claim 1, wherein the diffraction device and the image sensor are further configured to have different periodicities such that the first periodicity is different from the second periodicity.

4. The device of claim 1, wherein the array of apertures of the diffraction device correspond to one of an array of pinholes, an array of slits, or an array of diaphragms.

5. The device of claim 1, wherein the array of apertures of the diffraction device is arranged along the first axis and a second axis as a first two-dimensional array, wherein the first axis and the second axis are orthogonal relative to one another.

6. The device of claim 1, wherein the array of apertures of the diffraction device is arranged along a radial axis about a central point of the diffraction device.

7. The device of claim 1, wherein the diffraction device further comprises two or more different planar regions, where each of the two or more planar regions has a different aperture pattern.

8. The device of claim 1, further comprising: a first region of the diffraction device having an aperture pattern with a first periodicity between adjacent apertures, and a second region of the diffraction device having an aperture pattern with a second periodicity between adjacent apertures, wherein the sensitivity of the first region is different from the sensitivity of the second region based on the different aperture spacings.

9. The device of claim 5, wherein the array of image pixels of the image sensor is arranged along the first axis and the second axis as a second two-dimensional array.

10. The device of claim 1, wherein the image sensor corresponds to one or more of a CMOS image sensor, a CCD image sensor or a QIS image sensor.

11. The device of claim 1, wherein the demodulator comprises: a first multiplier, a second multiplier, a first averager, a second averager, and an angle detector, wherein
   the first multiplier is configured to multiply the image capture with an in-phase reference image to generate in-phase values;
   the first averager is configured to average the in-phase values to generate the in-phase averaged value;
   the second multiplier is configured to multiply the image capture with a quadrature reference image to generate quadrature values;
   the second averager is configured to average the quadrature values to generate the quadrature averaged value; and
   the angle detector is configured to compute the phase angle from the in-phase averaged value and the quadrature averaged value.

12. The device of claim 11, wherein the reference diffraction pattern corresponds to the array of values for the captured image after the device is calibrated.

13. The device of claim 11, wherein the reference diffraction pattern comprises one or more a sine reference image, a cosine reference image, corresponds to the array of values for the captured image after the device is calibrated.

14. The device of claim 1, wherein the demodulator comprises one of: a standalone electronic device, a portion of another electronic device, or a functional portion of a processor that may be configured to execute instructions to at least partially implement a demodulation process.

15. A system to determine an alignment change between two displays, the system comprising:
   a first Talbot sensor that is positioned about one of the two displays and configured to generate a first captured image, wherein the first Talbot sensor includes a first diffraction device and a first image sensor;
   a second Talbot sensor that is positioned about a second of the two displays and configured to generate a second captured image, wherein the second Talbot sensor includes a second diffraction device and a second image sensor;
   a system processor that is configured to receive the captured images from the first and second Talbot sensors, the system processor comprising:
      a demodulator that is configured to:
         demodulate the first captured image relative to a first reference diffraction pattern to detect a first phase angle; and
         demodulate the second captured image relative to a second reference diffraction pattern to detect a second phase angle; and
      a display subsystem that is configured to receive the first and second phase angles from the demodulator and responsively adjust one or more display parameters associated with one or more of the two displays.

16. The system of claim 15, wherein:
   the first diffraction device includes an array of apertures arranged according to a first periodicity;
   the second diffraction device includes an array of apertures arranged according to the first periodicity;
   the first image sensor includes a first array of image pixels configured to capture the first captured image as incident light passes through one or more of the apertures of the first diffraction device; and the second image sensor includes a second array of image pixels configured to capture the second captured image as incident light passes through one or more of the apertures of the second diffraction device.

17. The system of claim 15, wherein the display subsystem is further configured to adjust display parameters for one or more of: an image position, an image angle, an image virtual focal point, an image color, an image contrast to correct for features of misaligned displays.

18. A method for determining an alignment change in a display, the method comprising:

detecting light that passes through a diffraction device with an image sensor;

receiving an array of values of a captured image from the image sensor with a demodulator;

demodulating the captured image to generate in-phase and quadrature averaged values with the demodulator;

determining a phase angle between the in-phase and quadrature averaged values with the demodulator; and adjusting one or more display parameters associated with the display responsive to changes in the determined phase angle.

19. The method of claim 18, wherein demodulating the captured image further comprises:

multiplying the captured image with a sine reference image to generate in-phase values;

multiplying the captured image with a cosine reference image to generate quadrature values;

averaging the in-phase values to generate averaged in-phase values;

averaging the quadrature values to generate averaged quadrature values; and determining the phase angle from the ratio of the averaged in-phase and averaged quadrature values.

20. The method of claim 19, further comprising capturing the sine and cosine reference images from the image sensor after an initial calibration.

\* \* \* \* \*